US011916297B2

(12) United States Patent
Jia et al.

(10) Patent No.: US 11,916,297 B2
(45) Date of Patent: Feb. 27, 2024

(54) LIQUID CRYSTAL ANTENA AND FABRICATION THEREOF

(71) Applicant: Shanghai Tianma Micro-Electronics Co., Ltd., Shanghai (CN)

(72) Inventors: Zhenyu Jia, Shanghai (CN); Kerui Xi, Shanghai (CN); Baiquan Lin, Shanghai (CN); Xiaonan Han, Shanghai (CN); Zuocai Yang, Chengdu (CN); Donghua Wang, Chengdu (CN); Yukun Huang, Shanghai (CN); Feng Qin, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 107 days.

(21) Appl. No.: 17/668,179

(22) Filed: Feb. 9, 2022

(65) Prior Publication Data

US 2023/0163481 A1 May 25, 2023

(30) Foreign Application Priority Data

Nov. 22, 2021 (CN) ......................... 202111385426.X

(51) Int. Cl.

| | |
|---|---|
| ***H01Q 21/00*** | (2006.01) |
| ***H01Q 1/48*** | (2006.01) |
| *H01Q 3/36* | (2006.01) |

(52) U.S. Cl.

CPC ........... *H01Q 21/0075* (2013.01); *H01Q 1/48* (2013.01); *H01Q 21/0087* (2013.01); *H01Q 3/36* (2013.01)

(58) Field of Classification Search

CPC .. H01Q 21/0075; H01Q 1/48; H01Q 21/0087; H01Q 3/36

See application file for complete search history.

(56) References Cited

U.S. PATENT DOCUMENTS

| | | | | |
|---|---|---|---|---|
| 10,967,428 B2* | 4/2021 | Mu | ........................... | B22F 1/02 |
| 2014/0102773 A1* | 4/2014 | Nagata | ................... | H05K 1/056 174/255 |
| 2018/0301806 A1* | 10/2018 | Orui | ......................... | H01Q 3/44 |
| 2018/0324960 A1* | 11/2018 | Lee | .......................... | H01Q 1/38 |

(Continued)

FOREIGN PATENT DOCUMENTS

| | | |
|---|---|---|
| CN | 107658547 A | 2/2018 |
| CN | 110034358 A | 7/2019 |

(Continued)

*Primary Examiner* — Dimary S Lopez Cruz
*Assistant Examiner* — Aladdin Abdulbaki
(74) *Attorney, Agent, or Firm* — Anova Law Group, PLLC

(57) ABSTRACT

A liquid crystal antenna and a method for forming a liquid crystal antenna are provided. The liquid crystal antenna includes a first substrate; a second substrate opposite to the first substrate; and a liquid crystal layer disposed between the first substrate and the second substrate. A first conductive layer is disposed on a side of the first substrate facing toward the second substrate; a second conductive layer is disposed on a side of the second substrate facing toward the first substrate; the second conductive layer at least includes a plurality of radiation electrodes; an external metal layer is disposed on a side of the first substrate facing away from the liquid crystal layer; and the external metal layer is connected to a fixed potential.

19 Claims, 30 Drawing Sheets

(56) References Cited

U.S. PATENT DOCUMENTS

| | | | | |
|---|---|---|---|---|
| 2020/0266553 | A1* | 8/2020 | Cao | H01Q 21/065 |
| 2022/0006165 | A1* | 1/2022 | Jia | H01P 5/12 |
| 2023/0216189 | A1* | 7/2023 | Woo | H01Q 1/243<br>343/846 |

FOREIGN PATENT DOCUMENTS

| | | | | | |
|---|---|---|---|---|---|
| CN | 110350310 | A | | 10/2019 | |
| CN | 110658646 | A | | 1/2020 | |
| CN | 112151954 | A | * | 12/2020 | H01Q 1/42 |
| CN | 112688037 | A | | 4/2021 | |
| WO | WO 2020001519 | A1 | * | 1/2020 | H01Q 3/36 |
| WO | WO 2022198481 | A1 | * | 9/2022 | H01P 1/20 |

* cited by examiner

- S01: Providing a first substrate and forming a first conductive layer on the first substrate
- S011: Using the second conductive layer to fabricate a power division network structure and a plurality of microstrip lines
- S02: Providing a second substrate and forming a second conductive layer on the second substrate
- S021: Using the second conductive layer to make a plurality of radiation electrodes, a power division network structure, and a plurality of microstrip lines
- S03: Pairing the first substrate with the second substrate, and disposing a liquid crystal layer between the first substrate and the second substrate, wherein the first conductive layer is disposed opposite to the second conductive layer
- S04: Disposing an external metal layer on a side of the first substrate away from the liquid crystal layer to cause the external metal layer to be connected with a fixed potential

FIG. 26

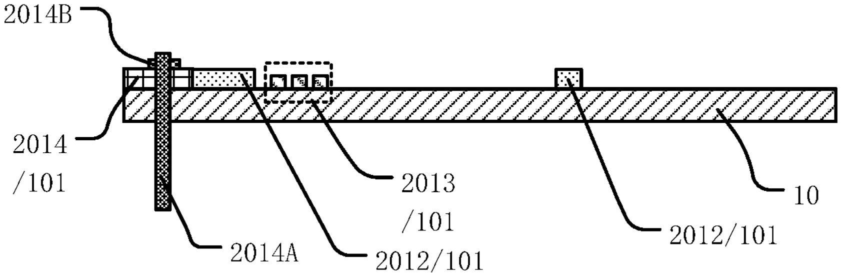

FIG. 27

LIQUID CRYSTAL ANTENA AND FABRICATION THEREOF

CROSS-REFERENCE TO RELATED APPLICATION

This application claims the priority of Chinese Patent Application No. 202111385462.X, filed on Nov. 22, 2021, the content of which is incorporated by reference in its entirety.

TECHNICAL FIELD

The present disclosure generally relates to the field of wireless communication technologies and, more particularly, relates to a liquid crystal antenna and a method for fabricating a liquid crystal antenna.

BACKGROUND

Liquid crystal antenna is a new type of array antenna based on the liquid crystal phaser, which is widely used in satellite receiving antenna, vehicle radar, base station antenna and other fields. The liquid crystal phaser is the core component of the liquid crystal antenna. The liquid crystal phaser and the ground layer form an electric field to control the deflection of liquid crystal molecules to realize the control of the liquid crystal equivalent dielectric constant, and then to realize the adjustment the phase of the electromagnetic wave. Liquid crystal antennas have broad application prospects in the fields of satellite receiving antennas, vehicle radars, and 5G base station antennas.

However, the yield of liquid crystal antenna products is very low. Further, customized liquid crystal antenna products are very expensive and costly. In addition, due to the need for customized manufacturing, the liquid crystal antenna cannot be manufactured in large quantities, so commercial mass production cannot be realized at present, which restricts the development of liquid crystal antenna technology.

Therefore, there is a need to provide a liquid crystal antenna and a fabrication method that can realize the antenna function, reduce process difficulty and production cost, and improve production efficiency and product yield is a technical problem to be solved by those skilled in the art. The disclosed liquid crystal antenna and the method for fabricating the liquid crystal antenna are direct to solve one or more problems set forth above and other problems in the arts.

SUMMARY

One aspect of the present disclosure provides a liquid crystal antenna. The liquid crystal antenna includes a first substrate; a second substrate opposite to the first substrate; and a liquid crystal layer disposed between the first substrate and the second substrate. A first conductive layer is disposed on a side of the first substrate facing toward the second substrate; and a second conductive layer is disposed on a side of the second substrate facing toward the first substrate. The second conductive layer at least include a plurality of radiation electrodes. An external metal layer is disposed on a side of the first substrate away from the liquid crystal layer; and the external metal layer is connected to a fixed potential.

Another aspect of the present disclosure provides a method for forming a liquid crystal antenna. The method includes providing a first substrate and forming a first conductive layer on a side of the first substrate; providing a second substrate and forming a second conductive layer on a side of the second substrate, wherein the second conductive layer at least includes a plurality of radiation electrodes of block shape; pairing the first substrate with the second substrate, and disposing a liquid crystal layer between the first substrate and the second substrate, wherein the first conductive layer is disposed opposite to the second conductive layer; and disposing an external metal layer on a side of the first substrate away from the liquid crystal layer to cause the external metal layer to be connected with a fixed potential.

Another aspect of the present disclosure includes providing a liquid crystal antenna. The liquid crystal antenna includes a plurality of antenna units spliced together. Each of the plurality of liquid crystal antenna includes a first substrate; a second substrate opposite to the first substrate; and a liquid crystal layer disposed between the first substrate and the second substrate. A first conductive layer is disposed on a side of the first substrate facing toward the second substrate; and a second conductive layer is disposed on a side of the second substrate facing toward the first substrate. The second conductive layer at least include a plurality of radiation electrodes. An external metal layer is disposed on a side of the first substrate away from the liquid crystal layer; and the external metal layer is connected to a fixed potential.

Other aspects of the present disclosure can be understood by those skilled in the art in light of the description, the claims, and the drawings of the present disclosure.

BRIEF DESCRIPTION OF THE DRAWINGS

The drawings incorporated in the specification and constituting a part of the specification illustrate the embodiments of the present disclosure, and together with the description are used to explain the principle of the present disclosure.

FIG. 26 illustrates a flow chart of another exemplary fabrication method of a liquid crystal antenna according to various disclosed embodiments of the present disclosure;

FIG. 27 illustrates an exemplary structure formed by the method in FIG. 26 after forming the first conductive structure;

DETAILED DESCRIPTION

Figure 1:
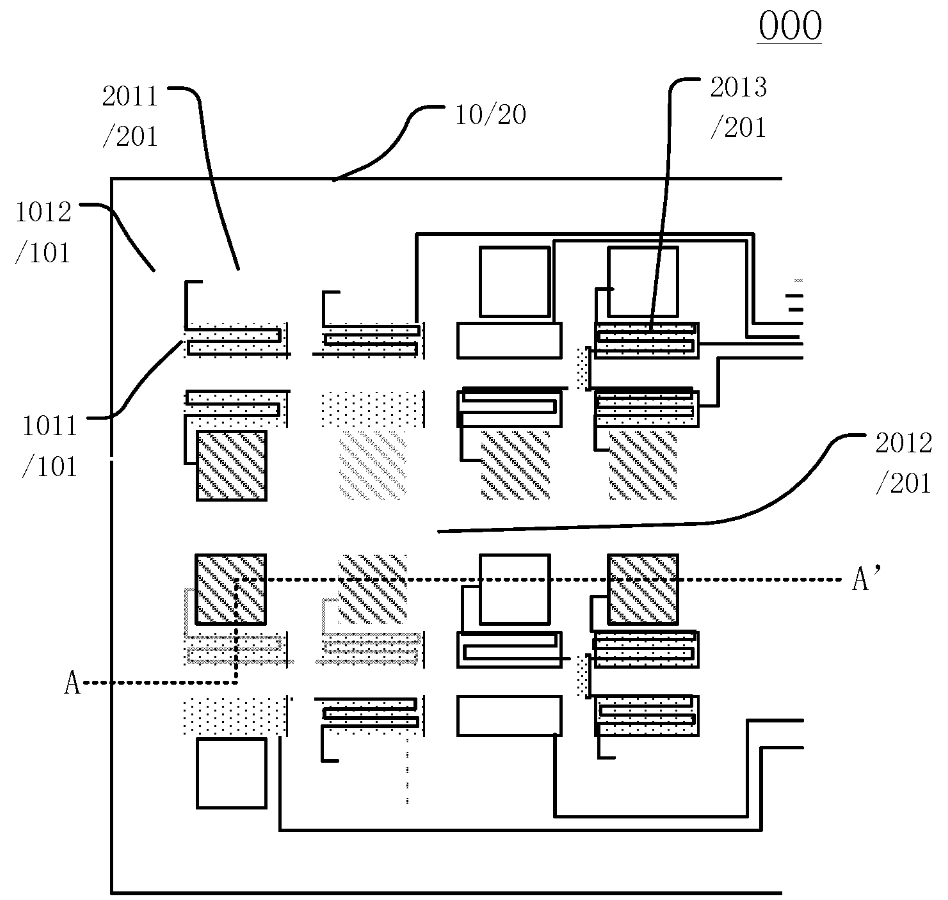
FIG. 1 illustrates a top view of an exemplary liquid crystal antenna according to various disclosed embodiments of the present disclosure.

Various exemplary embodiments of the present disclosure will now be described in detail with reference to the accompanying drawings. It should be noted that unless specifically stated otherwise, the relative arrangement, numerical expressions and numerical values of the components and steps set forth in these embodiments do not limit the scope of the present disclosure.

The following description of at least one exemplary embodiment is actually only illustrative, and in no way serves as any limitation to the present disclosure and its application or use.

The techniques, methods, and equipment known to those of ordinary skill in the relevant fields may not be discussed in detail, but where appropriate, the techniques, methods, and equipment should be regarded as part of the specification.

In all examples shown and discussed herein, any specific value should be interpreted as merely exemplary, rather than as a limitation. Therefore, other examples of the exemplary embodiment may have different values.

It should be noted that similar reference numerals and letters indicate similar items in the following drawings, therefore, once an item is defined in one drawing, it does not need to be further discussed in the subsequent drawings.

The existing liquid crystal antenna structure is generally improved based on the structure of the liquid crystal display panel. Because the liquid crystal display technology and the liquid crystal antenna technology both adopt the deflection performance of the liquid crystal, those skilled in the art carry out some designs on the basis of the liquid crystal display structure. To achieve the effect of the liquid crystal antenna, for example, the published patent number CN107658547A discloses a liquid crystal antenna including two substrates and a liquid crystal structure located between the two substrates. The upper and lower surfaces of the upper substrate and the upper and lower surfaces of the lower substrate are all provided with the structures to achieve the liquid crystal antenna function, such as phaser, a metal ground structure, and a metal radiation electrode structure. The details can be referred to the description of the publication text. Although the liquid crystal antenna of the patent document has completed the manufacture of phaser, metal grounds, and metal radiation electrodes to achieve electromagnetic radiation requirements, the manufacturing process involves the manufacturing process of copper plating on both sides of the antenna. In the double-sided copper plating process, the conductive structure on one side of the upper substrate needs to be protected, and a protective layer is added to the surface, and then the other side of the upper substrate is turned over for the copper plating and patterning. Finally, after copper plating is completed on the upper and lower surfaces of the upper substrate, if the protective layer will affect the dielectric properties of the liquid crystal antenna, a process step to remove the protective layer needs to be added. For example, the double-sided copper plating process involves a single-sided protection and a double-sided patterning. The process not only has a large number of process consumables, but also has a low product yield, which greatly increases the manufacturing cost and manufacturing difficulty, and is likely to adversely affect the commercial promotion of the final products.

The present disclosure provides a liquid crystal antenna and a method for forming a liquid crystal antenna, which may realize the function of the antenna while reducing process difficulty and production cost, and improving production efficiency and product yield.

Figure 2:
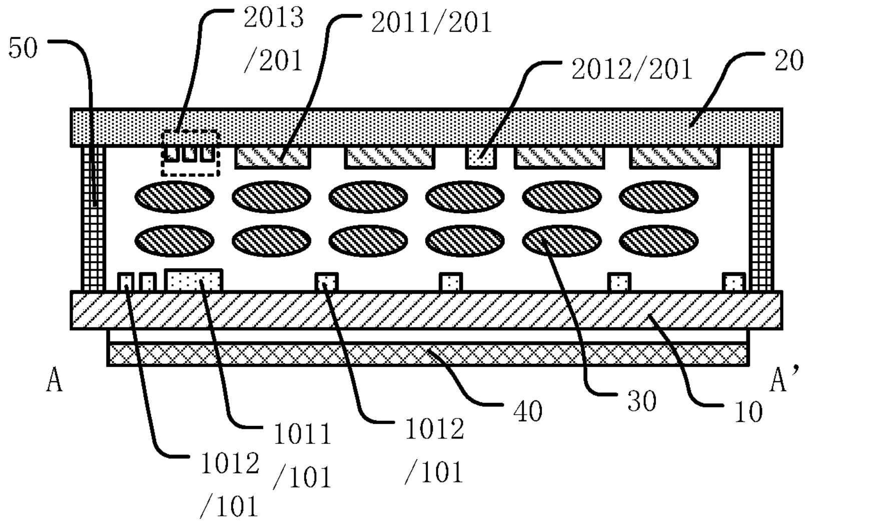
FIG. 2 illustrates an A-A'-sectional view of the exemplary liquid crystal antenna in FIG. 1.
Figure 3:
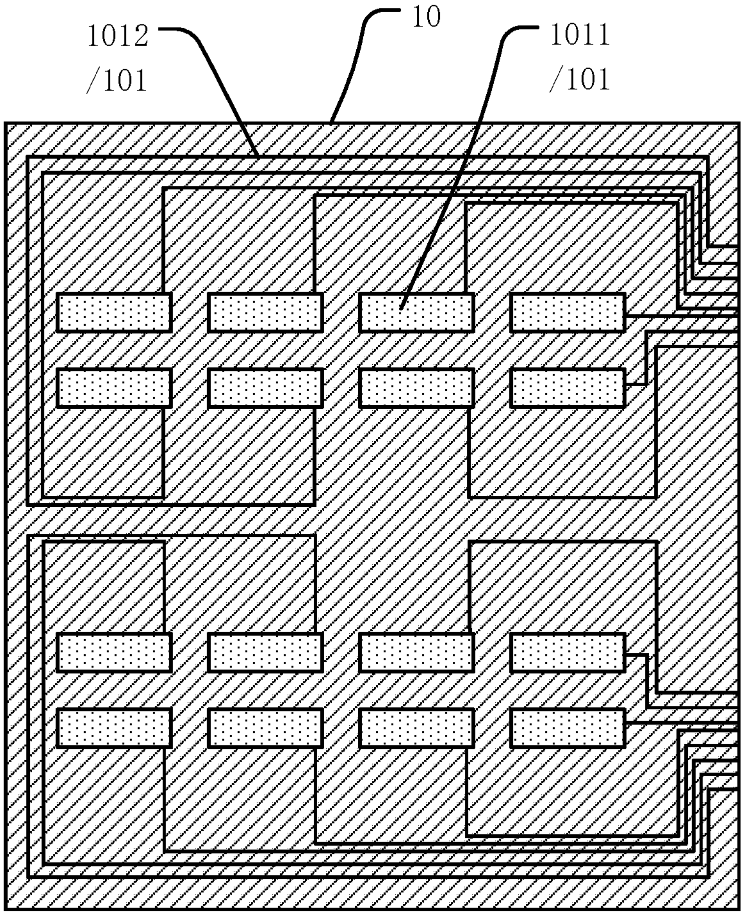
FIG. 3 illustrates an exemplary structure of a side of first substrate facing toward the second substrate in FIG. 2.
Figure 4:
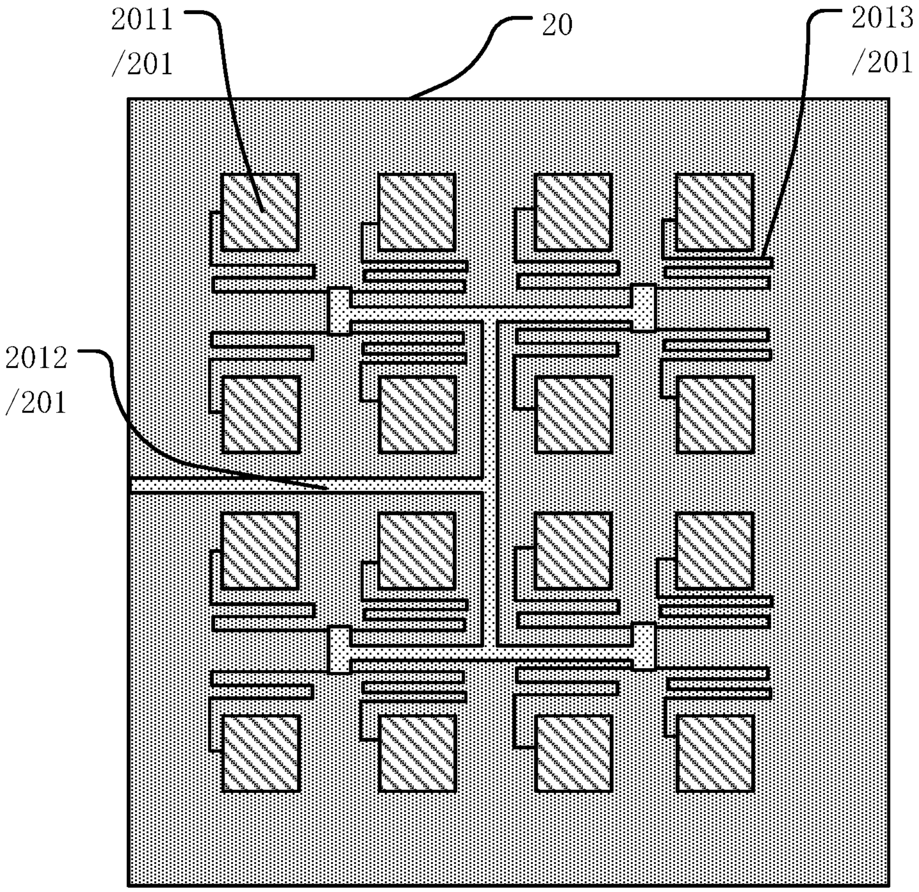
FIG. 4 illustrates an exemplary structure of a side of the second substrate facing toward the first substrate in FIG. 2.
Figure 5:
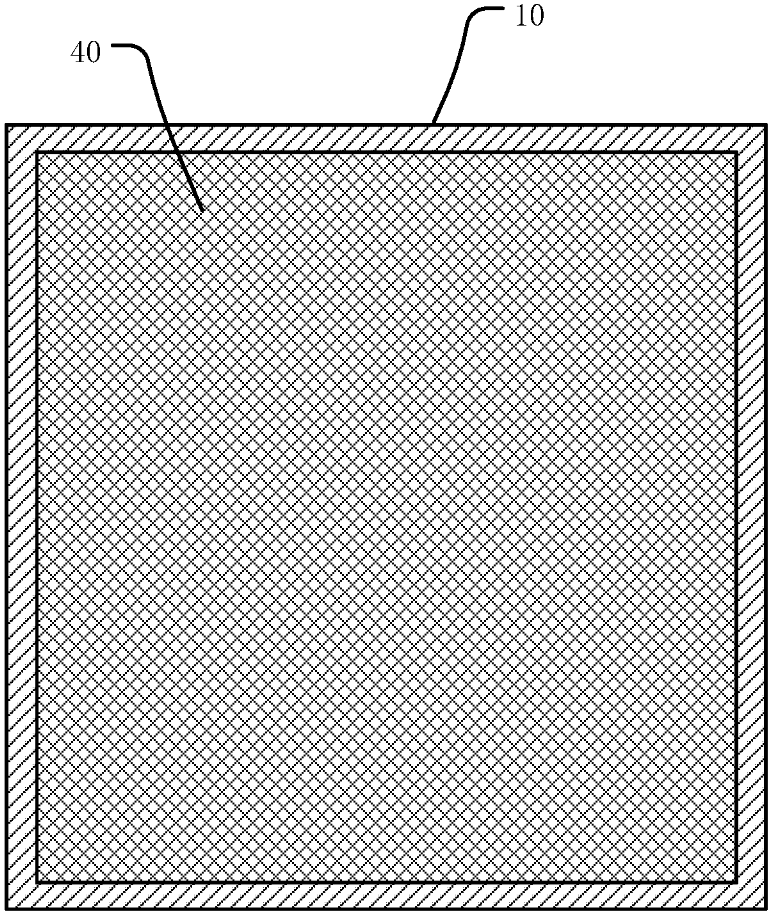
FIG. 5 illustrates an exemplary structure of a side of the first substrate away from the second substrate in FIG. 2.

FIG. 1 illustrates an exemplary liquid crystal antenna according to various disclosed embodiments of the present disclosure (it is understandable that to clearly illustrate the structure of this embodiment, FIG. 1 is filled with transparency). FIG. 2 illustrates an A-A'-sectional view of the exemplary liquid crystal antenna in the FIG. 1. FIG. 3 is a schematic structural view of a side of the first substrate facing toward the second substrate in FIG. 2. FIG. 4 is a schematic structural view of a side of the second substrate facing toward the first substrate in FIG. 2. FIG. 5 is a schematic structural view of a side of the first substrate facing away from the second substrate in FIG. 2.

As shown in FIGS. 1-5, a liquid crystal antenna 000 provided in one embodiment of present disclosure may include a first substrate 10 and a second substrate 20 (not filled in FIG. 1), and a liquid crystal layer 30 disposed between the first substrate 10 and the second substrate 20. A first conductive layer 101 may be disposed on the side of the first substrate 10 facing toward the second substrate 20; a second conductive layer 201 may be disposed on the side of the second substrate 20 facing toward the first substrate 10; and the second conductive layer 201 may at least include a plurality of radiation electrodes 2011. Further, an external metal layer 40 may be disposed on the side of the first substrate 10 facing away from the liquid crystal layer 30, and the external metal layer 40 may be connected to a fixed potential.

Specifically, the liquid crystal antenna 000 of this embodiment may include the first substrate 10 and the second substrate 20 disposed opposite to each other, and the liquid crystal layer 30 may be disposed between the first substrate 10 and the second substrate 20. The side of the first substrate 10 facing the second substrate 20 may include the first conductive layer 101, and the first conductive layer 101 may be configured to provide a portion of the structures that realize the antenna function, such as phaser structures, etc. The side of the second substrate 20 facing the first substrate 10 may include the second conductive layer 201; and the second conductive layer 201 may at least include the plurality of radiation electrodes 2011, and the radiation electrodes 2011 may be configured to radiate the microwave signal of the liquid crystal antenna 000. In such an embodiment, the materials of the first conductive layer 101 and the second conductive layer 201 may not be specifically limited, and may only need to be conductive. For example, the first conductive layer 101 and the second conductive layer 201 may be made of a metal conductive material, such as copper, etc.

The first conductive layer 101 in this embodiment may also include a driving electrode 1011 and a bias voltage signal line 1012. The driving electrode 1011 may have a block shape as shown in FIG. 3, and the driving electrode 1011 may be electrically connected to an external power supply terminal (not shown in the figure, for example, a voltage signal can be provided by binding a driving chip) through at least one bias voltage signal line 1012. Each driving electrode 1011 may independently control the liquid crystal antenna by at least one bias voltage signal line 1012. For example, the bias voltage signal line 1012 may be configured to transmit the voltage signal provided by the external power supply terminal to the driving electrode 1011 to control the deflection electric field of the liquid crystal molecules of the liquid crystal layer 30 between the first substrate 10 and the second substrate 20.

Further, as shown in FIG. 3, the plurality of driving electrodes 1011 may be uniformly distributed on the first substrate 10 as an array. It can be understood that the specific number, distribution, and material of the driving electrodes 1011 on the side of the first substrate 10 facing toward the second substrate 20 may be set by those skilled in the art according to actual conditions, and there is no specific limitation here. The figure in this embodiment only exemplarily shows the wiring structure of each bias voltage signal line 1012, which includes but is not limited to this, and may also be other layout structures, which is not limited in this embodiment.

In one embodiment, in addition to the plurality of radiation electrodes 2011, the second conductive layer 201 of the second substrate 20 of this embodiment may also include a power division network structure 2012 and a plurality of phaser structures connected to the power division network structure 2012. Further, each phaser structure may have a one-to-one correspondence with the driving electrode 1011 on the first substrate 10 to generate the deflection electric field to drive the liquid crystal molecules of the liquid crystal layer 30. Through the voltage transmitted to the driving electrode 1011 by the bias voltage signal 1012, the intensity of the electric field formed between the phaser structure and the driving electrode 1011 may be controlled to adjust the deflection angle of the liquid crystal molecules of the liquid crystal layer 30 in the corresponding space to change the dielectric constant of the liquid crystal layer 30 to change the phase shift of the microwave signal in the liquid crystal layer 30.

The power division network structure 2012 of this embodiment may be configured to input microwave signals to each phaser structure. The phaser structure may be a microstrip line 2013, and the shape of the microstrip line 2013 may be zigzag (as shown in FIG. 4) or spiral (not shown in the figure) or other structures, the microwave signal transmitted by the power division network structure 2012 may be further transmitted to each phaser structure, and the zigzag or spiral phaser structure may be able to increase the facing area between the phaser structure and the driving electrode 1011 to ensure that as many liquid crystal molecules as possible in the liquid crystal layer 30 may be in the electric field formed by the phaser structure and the driving electrode 1011, and the flipping efficiency of the liquid crystal molecules may be improved. This embodiment does not limit the shape and distribution of the phaser structure, and the phaser may only need to be able to realize the transmission of microwave signals. It can be understood that, to clearly illustrate the structure of this embodiment, FIG. 4 only illustrates 16 phaser structures on the second substrate 20, but it is not limited to this number. In specific implementation, the number of phaser structures may be arranged as an array according to actual needs.

In one embodiment, the radiation electrodes 2011 of this embodiment may be connected to the phaser structure. After the phase shift of the microwave signal is completed, the phase shifted microwave signal may transmitted to the radiation electrodes 2011 through the phaser structure, and the microwave signal of the liquid crystal antenna 000 may radiated out through the radiation electrodes 2011.

This embodiment only exemplifies the structures that may be included in the first conductive layer 101 and the second conductive layer 201 that may implement the antenna function, including but not limited to this. The first conductive layer 101 on the first substrate 10 and the second conductive layer 201 on the second substrate 20 may also include other structures that may realize the antenna function, as long as that the first conductive layer 101 may be disposed on the side of first substrate 10 facing toward the second substrate 20, the second conductive layer 201 may be disposed on the side of the second substrate 20 facing toward the first substrate 10, and the radiation electrode 2011 may also be disposed in the liquid crystal cell. For example, all the structures integrated in a liquid crystal cell and configured to realize the antenna function may be only arranged on one side surface of the same substrate to avoid the introduction of the process of manufacturing conductive layers on both sides of the substrate during the manufacturing process of the liquid crystal antenna 000. That is, this embodiment may not need to use the processes of fabricating and patterning conductive metal layers on both sides of the substrate. Accordingly, the processes of fabricating a conductive structure on one side of the substrate and then turning it over to fabricate another conductive structure on the other side surface, and exposing, developing, and etching may be omitted, the manufacturing difficulty and manufacturing cost may be reduced, and the production efficiency and the product yield may be increased.

In one embodiment, the side of the first substrate 10 away from the liquid crystal layer 30 may further include an external metal layer 40 connected to a fixed potential. The external metal layer 40 may be fixed on the first substrate 10 through an adhesive component (not filled). In some embodiments, the fixed potential of the optional external metal layer 40 may also be provided by a boned driving chip, which is not described in detail in this embodiment. It can be understood that the external metal layer 40 may refer to a structure that may be additionally fabricated on the surface of the first substrate 10 away from the liquid crystal layer 30 after the first substrate 10 and the second substrate 20 are formed into a liquid crystal cell, such that, in the process of manufacturing the liquid crystal cell, it may be avoided to provide conductive metal layers on both side of the first substrate 10. Accordingly, the difficulty of the production process may be reduced, and the production efficiency may be improved.

In one embodiment, the external metal layer 40 may be disposed on the entire surface of the first substrate 10 on the side of the first substrate 10 away from the liquid crystal layer 30 after the liquid crystal cell 30 is formed, and the external metal layer 40 may be connected to a fixed potential. It can be understood that the specific potential value of the external metal layer 40 connected to the fixed potential may not be specifically limited in this embodiment, and it may be selected and set according to actual requirements during specific implementation.

The external metal layer 40 of this embodiment may not only be used as a reflective layer, but when the microwave signal is phase-shifted, it may ensure that the microwave signal only propagates in the liquid crystal cell of the liquid crystal antenna 000 during the phase-shifting process, and may prevent it from diverging outside the liquid crystal antenna. When microwave signals are transmitted to the external metal layer 40, the microwave signals may be reflected back through the external metal layer 40 of the whole surface structure. The external metal layer 40 connected to the fixed potential may also be used to shield external signals to avoid external signals to interfere with the microwave signals to ensure the accuracy of the phase shift of the microwave signals, which may be beneficial to increase the radiation gain of the antenna. Moreover, because the external metal layer 40 of this embodiment may be a whole surface structure, when the first substrate 10 after the formation of the liquid crystal cell is arranged on the side of the liquid crystal layer 30 away from the liquid crystal layer 30, the requirements of the bonding accuracy may be reduced, which may beneficial to reduce the manufacturing difficulty and to further reduce manufacturing costs.

The liquid crystal antenna provided by this embodiment may not only realize the function of the antenna by providing the first conductive layer 101, the second conductive layer 201, and the external metal layer 40, but also avoid the use of metal layers on both sides of the substrate. The process may also eliminate the need to form a conductive layer on one side of the substrate and then protect it and then fabricate a conductive layer on the other side of the substrate; and it may reduce the steps of removing the protective layer. Thus, the production steps and the process difficulty may be significantly reduced, and the product yield of liquid crystal antenna may be improved.

Further, in one embodiment, the film layer connected to the fixed potential may be used as the external metal layer 40, which may be additionally fabricated on the outside of the substrate after the first substrate 10 and the second substrate 20 are formed into a liquid crystal cell. In the overall structure of the liquid crystal antenna 000, the external metal layer 40 of the entire surface structure may not only be used as a reflective layer such that when the microwave signal is transmitted to the external metal layer 40, the microwave signal may be reflected back through the external metal layer 40 of the entire surface structure to avoid its divergence to the outside of the liquid crystal antenna, the external metal layer 40 connected to the fixed potential may also be used to shield external signals to avoid interference from external signals to microwave signals, thereby ensuring the accuracy of phase shifting of microwave signals, which may be beneficial to increase the radiation gain of the antenna. Therefore, the external metal layer 40 of this embodiment may be a whole-surface structure and may not need to be patterned. Then, after the first substrate 10 and the second substrate 20 are formed into a liquid cell, the external metal layer 40 may additionally be fabricated on the substrate, the problem of alignment accuracy may not need to be considered and may just need to fix the external metal layer 40 of the whole structure directly on the outside of the substrate after the liquid crystal cell is formed. The process may be simple, and the use of expensive alignment equipment may be omitted. Thus, the production cost and process difficulty may be significantly reduced.

In one embodiment, the external metal layer 40 of a whole surface structure connected to the fixed potential may be fabricated on the outside of the substrate after the liquid crystal cell is formed. Thus, the consideration of the light transmittance and the alignment of the radiation holes may be avoided when other patterned conductive structures of the liquid crystal antenna are disposed on the outside of the substrate after the liquid crystal cell is formed. Thus, the process difficulty and production cost may be significantly reduced. It should be noted that the first substrate 10, the second substrate 20, and the liquid crystal layer 30 of this embodiment may form a liquid crystal cell, and the specific process of forming the liquid crystal cell may be set by those skilled in the art according to the actual situation, which is not limited here. For example, a frame sealant 50 may be coated on the first substrate 10, and then the liquid crystal is dispersed by the liquid crystal injection technology, and the first substrate 10 and the second substrate 20 may be aligned and bonded according to the alignment marks on the second substrate 20, and the sealant may be cured. The sealant 50 may make the first substrate 10 and the second substrate 20 adhere stably to obtain the liquid crystal cell. Specifically, the materials of the first substrate 10 and the second substrate 20 may also be set by those skilled in the art according to the actual situation, which is not limited here. Exemplarily, the first substrate 10 and the second substrate 20 may be any rigid material of glass and ceramics or may also be any flexible material of polyimide and silicon nitride. Such materials may not absorb microwave signals, that is, the insertion loss in the microwave frequency band may be substantially small. Thus, it may be beneficial to reduce the signal insertion loss, and may greatly reduce the loss of microwave signals in the transmission process.

It should be further explained that this embodiment only exemplarily illustrates the structure of the liquid crystal antenna 000, but is not limited to this, and may also include other structures, such as an alignment layer between the first substrate 10 and the second substrate 20, etc. It can be understood with reference to the structure of the liquid crystal antenna in the related art, which is not described in detail in this embodiment. This embodiment is only an example to illustrate the structure that the first conductive layer 101 and the second conductive layer 201 may be provided, including but not limited to the above-mentioned structure and working principle. In specific implementation, it can be set according to the required functions of the liquid crystal antenna. The examples are not repeated here.

In some embodiments, referring to FIGS. 1-5, the external metal layer 40 may be electrically contacted to ground. For example, the fixed potential connected to the external metal layer 40 may be a ground signal. The ground signal may be provided by a driving chip bonded to the liquid crystal antenna 000 (for example, on the edge of the first substrate 10, the area may be provided with a bonding area for the driving chip bonding. this embodiment will not be repeated here. The details may be referred to the technology of substrate bonding chip in the related art for understanding). Because the liquid crystal antenna 000 itself may need to be bonded with the driving chip to provide a driving voltage signal, and the ground signal in the driving chip may one of the more common and more useful signals, the fixed potential of the external metal layer 40 of this embodiment may be set as the ground signal to use the driving chip needed to be bonded with the liquid crystal antenna 000 needs to provide the fixed potential signal to avoid the complexity of the structure. Further, the external metal layer 40 connected to the ground signal and the radiation electrode 2011 on the second substrate 20 may form an antenna cavity structure to form a radiation gap at the edge of the radiation electrode 2011, which may be beneficial to radiate microwave signals.

Figure 6:
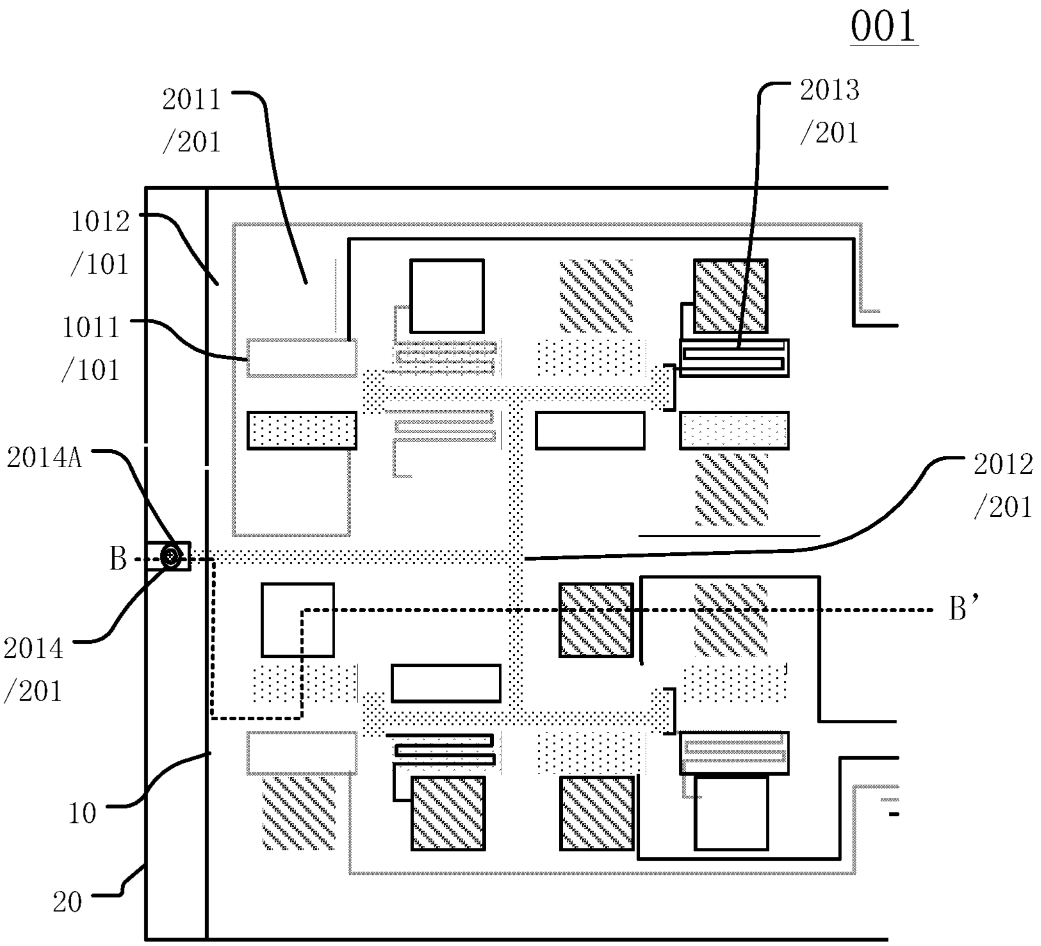
FIG. 6 illustrates another exemplary liquid crystal antenna according to various disclosed embodiments of the present disclosure.
Figure 7:
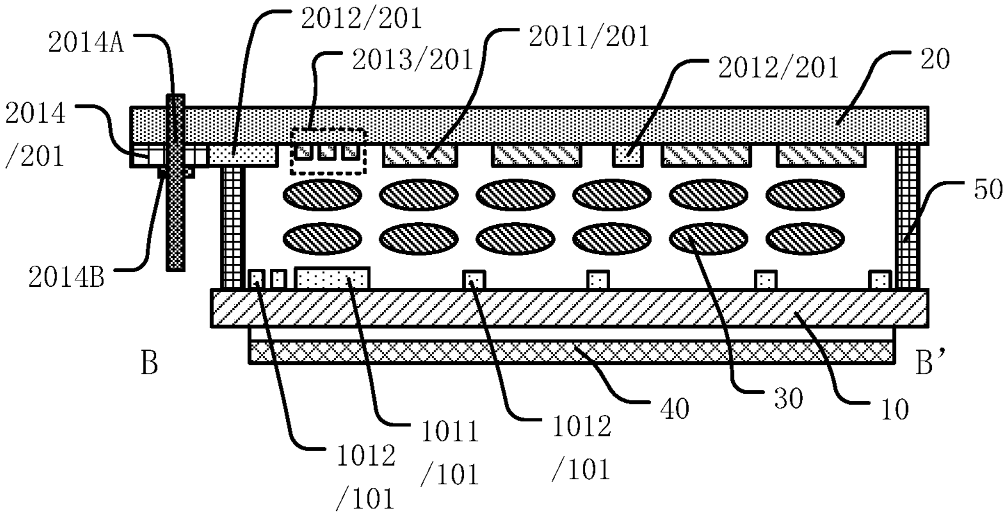
FIG. 7 illustrates a B-B'-sectional view of the exemplary liquid crystal antenna in FIG. 6.
Figure 8:
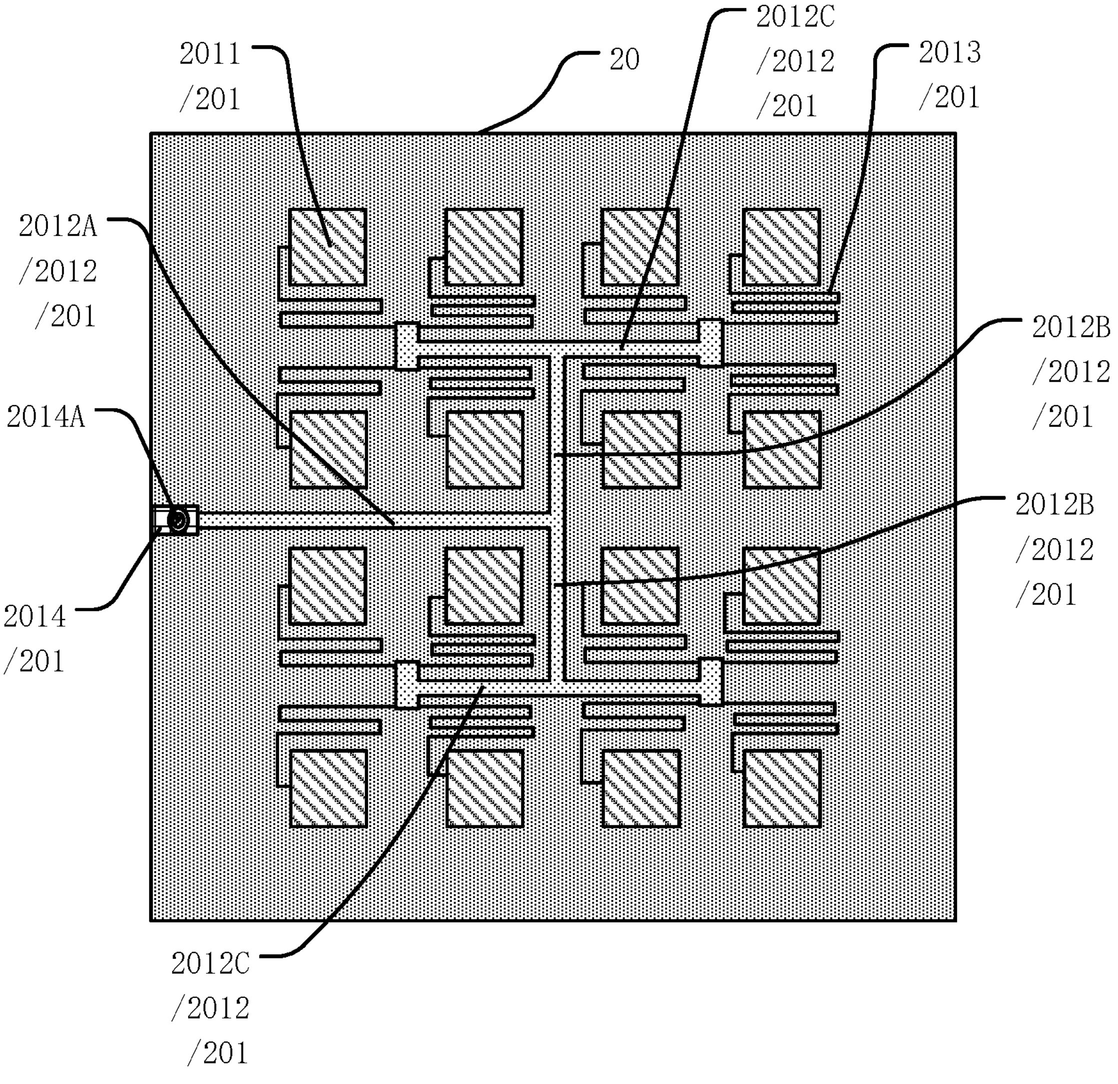
FIG. 8 illustrates an exemplary structure of a side of the first substrate facing toward the second substrate in FIG. 7.

FIG. 6 is a schematic diagram of a top view of another exemplary liquid crystal antenna according to various disclosed embodiments of the present disclosure (understandably, for clarity of the structure of this embodiment, FIG. 6 is filled with transparency). FIG. 7 is a schematic diagram of a B-B'-sectional view of the exemplary liquid crystal antenna in FIG. 6. FIG. 8 is an exemplary structure of the side of the second substrate facing toward the first substrate in FIG. 7 (it can be understood that the structural diagram of the surface of the first substrate facing the second substrate of this embodiment may be understood with reference to FIG. 3, and the structural diagram of the side of the first substrate away from the second substrate may be understood with reference to FIG. 5).

As shown in FIGS. 6-8, and referring to FIG. 3 and FIG. 5, in one embodiment, the first conductive layer 101 may include a plurality of driving electrodes 1011; and the second conductive layer 201 may also include a power division network structure 2012 and a plurality of microstrip lines 2013. The power division network structure 2012 may be connected to the signal input terminal 2014. One end of the microstrip line 2013 may be connected to the power division network structure 2012; and the other end of the micro-ribbon 2013 may be respectively connected to the radiation electrode 2011. The orthographic projection of the driving electrode 1011 on the second substrate 20 and the microstrip line 2013 may at least partially overlap.

In one embodiment, the first conductive layer 101 on the side of the first substrate 10 facing the second substrate 20 may be used to fabricate a plurality of driving electrodes 1011, and the plurality of block-shaped driving electrodes 1011 may be uniformly distributed as an array on the first substrate 10. The driving electrode 1011 may be connected to an external power supply terminal through at least one bias voltage signal line 1012, and each driving electrode 1011 may independently control the liquid crystal antenna by at least one bias voltage signal line 1012. For example, the bias voltage signal line 1012 may be configured to transmit the voltage signal provided by the external power supply terminal to the driving electrode 1011 to control the deflection electric field of the liquid crystal molecules of the liquid crystal layer 30 between the first substrate 10 and the second substrate 20. The second conductive layer 201 on the side of the second substrate 20 facing the first substrate 10 may be used to fabricate a plurality of radiation electrodes 2011, and may also be used to fabricate a power division network structure 2012 and a plurality of microstrip lines 2013 connected to the power division network structure 2012. One end of the power division network structure 2012 may be connected to the signal input terminal 2014.

In one embodiment, the signal input terminal 2014 may be inserted into a signal input rod 2014A and may be fixed by a coaxial cable connector 2014B. The signal input rod 2014A may be used to input the microwave signal and transmit it to the power division network structure 2012 through the signal input terminal 2014. The power division network structure 2012 may be a one-transmit-to-multiple structure. One end of the microstrip line 2013 may be connected to the power division network structure 2012. Thus, the microwave signal input from the signal input terminal 2014 may be simultaneously transmitted to each microstrip line 2013 through the power division network structure 2012. The orthographic projection of the driving electrode 1011 on the second substrate 20 and the microstrip line 2013 may at least partially overlap. For example, the driving electrode 1011 and the microstrip line 2013 may be in a one-to-one correspondence on the first substrate 10 and the second substrate 20 for generating the electric field that drives the deflection of the liquid crystal molecules of the liquid crystal layer 30. By controlling the bias voltage signal line 1012 to control the voltage transmitted to the driving electrode 1011, the intensity of the electric field formed between the microstrip line 2013 and the driving electrode 1011 may be controlled to adjust the corresponding deflection angle of the liquid crystal molecules of the liquid crystal layer 30 in the corresponding space, the dielectric constant of the liquid crystal layer 30 may be changed to realize the phase shift of the microwave signal in the liquid crystal layer 30 and to achieve the effect of changing the phase of the microwave. The other end of the microstrip line 2013 may be respectively connected to the radiation electrode 2011. After the phase shift of the microwave signal is completed, the phase-shifted microwave signal may be transmitted to the radiation electrode 2011 through the microstrip line 2013, and the microwave signal of the liquid crystal antenna 001 may be radiated out through the radiation electrode 2011.

The first substrate 10 of this embodiment may be provided with the first conductive layer 101 only on the side facing toward the second substrate 20, and the second substrate 20 may be provided with the second conductive layer 201 only on the side facing toward the first substrate 10. The phaser structure, the radiation electrode 2011, the power division network structure 2012, and the driving electrode 1011 may be integrated in the same liquid crystal cell through the first conductive layer 101 and the second conductive layer 201, and they may all be disposed on opposite sides of the liquid crystal layer 30 to realize the function of the liquid crystal antenna. Thus, it may be possible to avoid the introduction of the process of manufacturing conductive layers on both sides of the substrate during the manufacturing process of the liquid crystal antenna. For example, it may not be necessary to form and pattern conductive layers on both sides of a substrate, the process of forming a conductive structure on one side of the substrate and turning over to fabricate another layer of conductive structure on the other side surface, and exposure, development and etching may be omitted. Thus, it may be beneficial to reduce manufacturing difficulty and manufacturing cost, and the production efficiency, and the production yield may be improved.

In one embodiment, as shown in FIG. 8, the power division network structure 2012 in this embodiment may include a main section 2012A and multiple branch sections 2012B (in the figure, the configuration that a main section 2012A is connected to two branch sections 2012B is used as an example). One end of the main section 2012A may be connected to the signal input terminal 2014, the other end of the main section 2012A may be connected to one end of the branch section 2012B, the other end of the branch section 2012B may be connected to the microstrip line 2013, and the main section 2012A may be respectively connected to a plurality of branch sections 2012B. Each branch section 2012B may be connected to the microstrip line 2013 respectively, thereby realizing the one-transmit-to-multiple structure of the power division network structure 2012. Through the power division network structure 2012, the microwave signal inputted into the signal input terminal 2014 may be transmitted to each microstrip line 2013 at the same time.

It is understandable that when the number of microstrip lines 2013 included in the liquid crystal antenna is larger, that is, the corresponding array of driving electrodes 1011 is larger, and the number of driving electrodes 1011 may be larger. As shown in FIG. 8, one branch section 2012B of the power division network structure 2012 may be further connected to a plurality of sub-sections 2012C to further realize the effect of one-transmit-to-multiple at one time.

Figure 9:
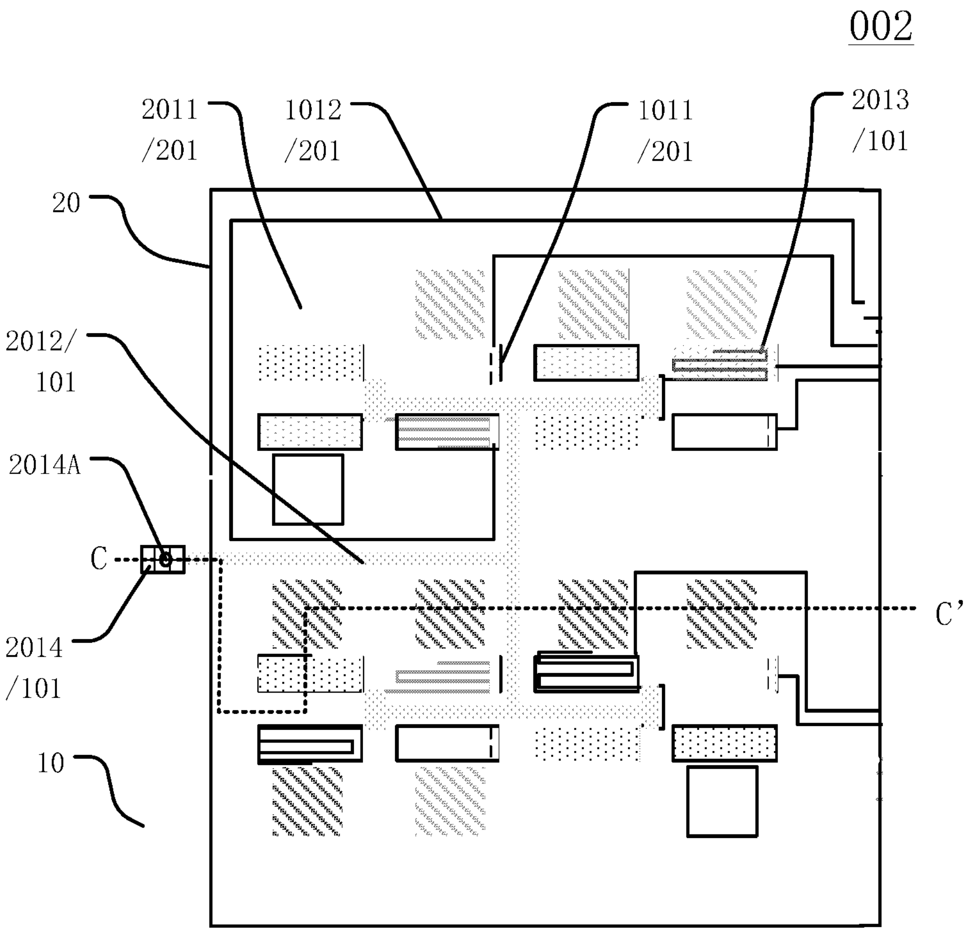
FIG. 9 illustrates another exemplary liquid crystal antenna according to various disclosed embodiments of the present disclosure.
Figure 10:
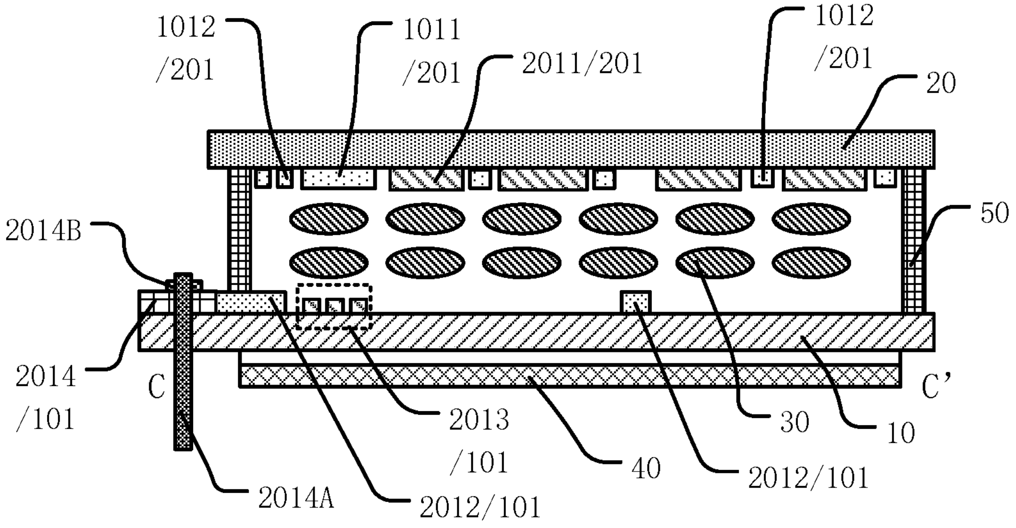
FIG. 10 illustrates a C-C'-sectional view of the exemplary liquid crystal antenna in FIG. 9.
Figure 11:
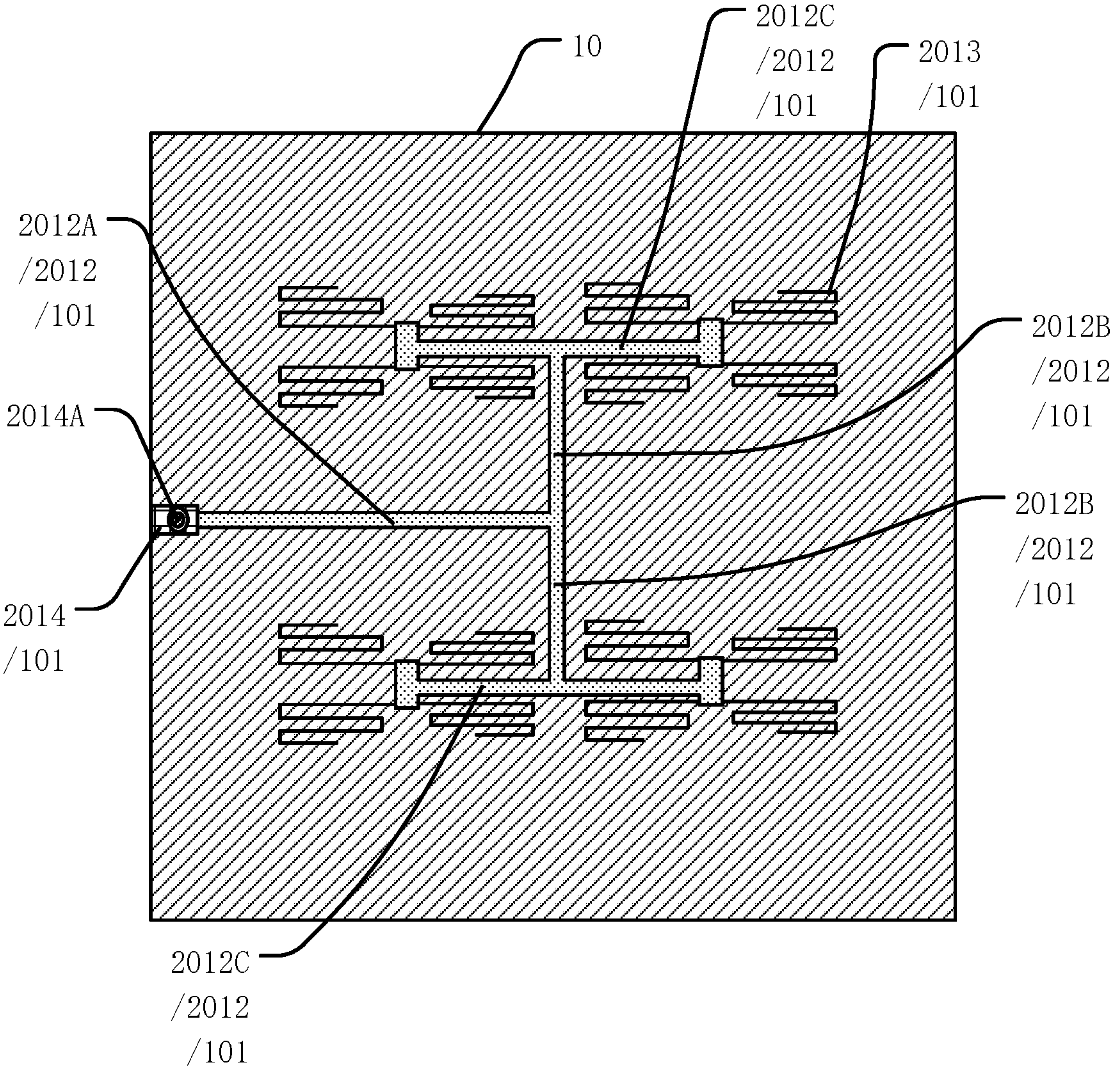
FIG. 11 illustrates an exemplary structure of the side of the first substrate facing toward the second substrate in FIG. 10.
Figure 12:
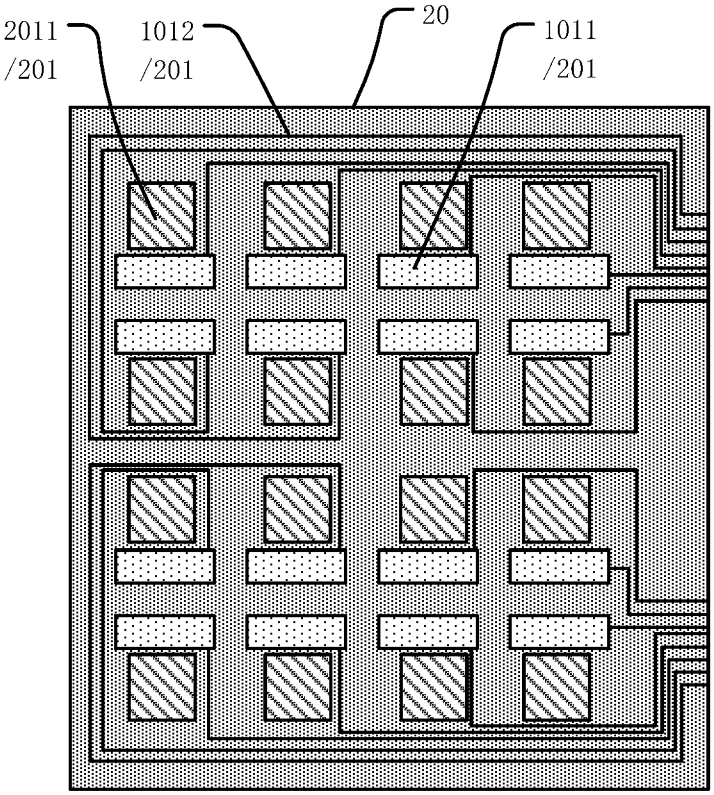
FIG. 12 illustrates an exemplary structure of a side of the second substrate facing toward the first substrate in FIG. 10.
Figure 13:
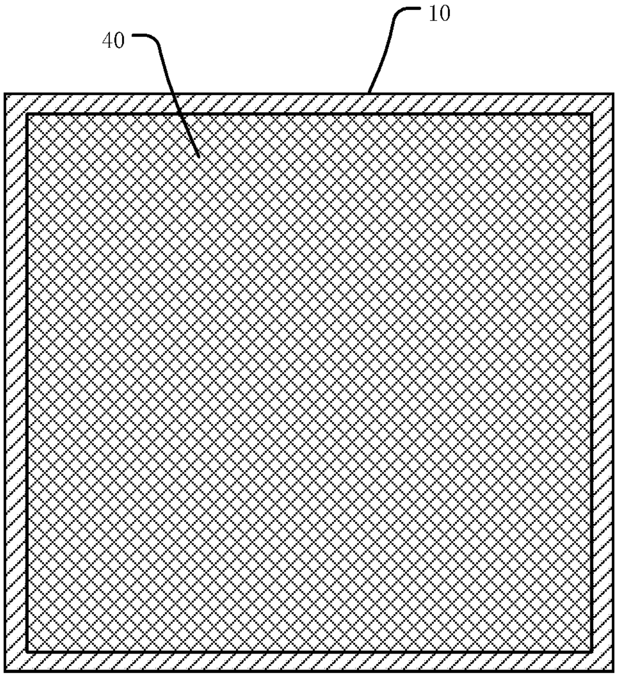
FIG. 13 illustrates an exemplary structure of a side of the first substrate facing away from the second substrate in FIG. 10.

FIG. 9 is a schematic diagram of a top view of another exemplary liquid crystal antenna according to various disclosed embodiments of the present disclosure (it is understandable that, to clearly illustrate the structure of this embodiment, FIG. 9 is filled with transparency). FIG. 10 is a schematic C-C'-sectional view of the exemplary liquid crystal antenna in FIG. 9. FIG. 11 is a schematic structural diagram of the side of the first substrate facing toward the second substrate in FIG. 10. FIG. 12 is a schematic structural view of the side of the second substrate facing toward the first substrate in FIG. 10. FIG. 13 is a schematic structural view of the side of the first substrate facing away from the second substrate in FIG. 10.

As shown in FIGS. 9-13, in a liquid crystal antenna 002 provided in this embodiment, the first conductive layer 101 may include a power division network structure 2012 and a plurality of microstrip lines 2013. The second conductive layer 201 may further includes a plurality of driving electrodes 1011, and the driving electrodes 1011 and the radiation electrodes 2011 may be insulated from each other. The power division network structure 2012 may be connected to the signal input terminal 2014. One end of the microstrip line 2013 may be connected to the power division network structure 2012. The orthographic projection of the microstrip line 2013 on the second substrate 20 and the driving electrode 1011 may at least partially overlap.

In this embodiment, the first conductive layer 101 located on the side of the first substrate 10 facing toward the second substrate 20 may be used to fabricate the power division network structure 2012, the plurality of microstrip lines 2013, and one end of the power division network structure 2012 may be connected to the signal input terminal 2014. In one embodiment, the signal input terminal 2014 may be inserted into the signal input rod 2014A and may be fixed by the coaxial cable connector 2014B. The signal input rod 2014A may be used to input microwave signals and pass the signals to the power division network structure 2012 through the signal input terminal 2014. The power division network structure 2012 may be a one-transmit-to-multiple network structure. One end of the microstrip line 2013 may be connected to the power division network structure 2012. Therefore, through the power division network structure 2012, the microwave signal input from the signal input terminal 2014 may be simultaneously transmitted to each microstrip line 2013. The second conductive layer 201 on the side of the second substrate 20 facing the first substrate 10 may be used to fabricate the plurality of radiation electrodes 2011 and may also be used to fabricate the plurality of driving electrodes 1011. The driving electrodes 1011 and the radiation electrodes 2011 may be insulated from each other.

In one embodiment, the driving electrodes 1011 and the radiation electrodes 2011 may both have a block structure. The driving electrodes 1011 of the block shape may be uniformly distributed on the second substrate 20 as an array, and the radiation electrodes 2011 of block shape may also be uniformly distributed on the second substrate 20 as an array.

Further, the second conductive layer 201 may also be used to provide a plurality of bias voltage signal lines 1012. The driving electrodes 1011 may be connected to an external power supply terminal through at least one bias voltage signal line 1012. Each driving electrode 1011 may be able to independently control the liquid crystal antenna through at least one bias voltage signal line 1012. For example, the bias voltage signal line 1012 may be used to transmit the voltage signal provided by the external power supply terminal to the driving electrode 1011, thereby controlling deflection electric field of the liquid crystal molecules of the liquid crystal layer 30 between the first substrate 10 and the second substrate 20. The orthographic projection of the microstrip line 2013 on the second substrate 20 may at least partially overlap the driving electrode 1011. For example, the driving electrode 1011 and the microstrip line 2013 may have one-to-one correspondence on the first substrate 10 and the second substrate 20 to generate the electric field that drives the deflection of the liquid crystal molecules of the liquid crystal layer 30. By controlling the voltage transmitted to the driving electrode 1011 through the bias voltage signal line 1012, the intensity of the electric field formed between the microstrip line 2013 and the driving electrode 1011 may be controlled to adjust the deflection angle of the liquid crystal molecules of the liquid crystal layer 30 in the corresponding space. Accordingly, the dielectric constant of the liquid crystal layer 30 may be changed to realize the phase shift of the microwave signals in the liquid crystal layer 30 and to achieve the effect of changing the phase of the microwave signals. After the phase shift of the microwave signal is completed, the phase shifted microwave signal may be coupled to the radiation electrodes 2011 on the second substrate 20 through the microstrip line 2013 on the first substrate 10, and the microwave signal of the liquid crystal antenna may be radiated out through the radiation electrodes 2011.

In such an embodiment, the first substrate 10 may be provided with the first conductive layer 101 only on the side facing toward the second substrate 20, and the second substrate 20 may be provided with the second conductive layer 201 only on the side facing toward the first substrate 10, through the conductive layer 101 and the second conductive layer 201, the phaser structure, the radiation electrodes 2011, the power division network structure 2012, and the driving electrodes 1011 may be fabricated in the same liquid crystal cell, and they may be all located on the opposite sides of the liquid crystal layer 30 to realize the function of the liquid crystal antenna. Accordingly, it may be possible to avoid the introduction of the process of manufacturing conductive layers on both sides of the substrate during the manufacturing process of the liquid crystal antenna. That is, the process for forming and patterning conducive layers on both sides of one substrate may be unnecessary. The process for forming the conductive structure on one side of the substrate and then turning over the substrate to fabricate another layer of conductive structure on the other side surface, and for exposure, development and etching may be omitted. Accordingly, the manufacturing difficulty and manufacturing cost may be reduced, and the production efficiency and the product yield may be improved.

In one embodiment, as shown in FIG. 11, the power division network structure 2012 may include a main section 2012A and a plurality of branch sections 2012B (in the figure, the configuration that the main section 2012A is connected to two branch sections 2012B is as an example). One end of the main section 2012A may be connected to the signal input terminal 2014, the other end of the main section 2012A may be connected to one end of the branch section 2012B, the other end of the branch section 2012B may be connected to the microstrip line 2013. Through the structure that the main section 2012A is respectively connected to the plurality of branch sections 2012B and each branch section 2012B is connected to the microstrip lines 2013 respectively, the one-transmit-to-multiple structure of the power division network structure 2012 may be realized. Through the power division network structure 2012, the microwave signal inputted the signal input terminal 2014 may be transmitted to each microstrip line 2013 at the same time.

It is understandable that when the number of microstrip lines 2013 included in the liquid crystal antenna is larger, that is, the corresponding array of driving electrodes 1011 is larger, and the number of driving electrodes 1011 may be larger. As shown in FIG. 8, one branch section 2012B of the power division network of the structure 2012 may be further connected to a plurality of sub-sections 2012C to further realize the one-transmit-to-multiple effect of the signals.

Figure 14:
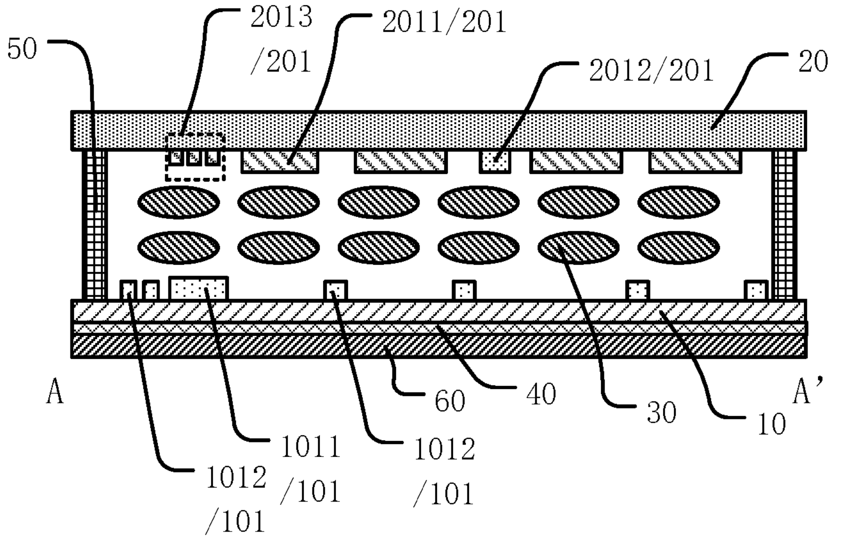
FIG. 14 illustrates another exemplary A-A'-sectional view of the exemplary liquid crystal antenna in FIG. 1.

FIG. 14 is a schematic diagram of another exemplary A-A' sectional view of the exemplary liquid crystal antenna in FIG. 1. As shown in FIG. 14 and referring to FIG. 1, in one embodiment, the liquid crystal antenna 200 may further include a third substrate 60. The external metal layer 40 may be attached on the third substrate 60, and the third substrate 60 and the external metal layer 40 together may be fixed on the side of the first substrate 10 facing away from the liquid crystal layer 30.

In such an embodiment, after the first substrate 10 and the second substrate 20 are formed into a liquid crystal cell, the external metal layer 40, which may be additionally fabricated on the surface of the first substrate 10 away from the liquid crystal layer 30, may be attached on the third substrate 60. The third substrate 60 may be configured as the carrier substrate of the external metal layer 40, and may be fixed on the side of the first substrate 10 facing away from the liquid crystal layer 30 together with the external metal layer 40. During the manufacturing process, the third substrate 60 may be manufactured in batches first. The fixing structure of the third substrate 60 and the external metal layer 40 may be disposed on the side of the first substrate 10 away from the liquid crystal layer 30 after the first substrate 10 and the second substrate 20 are formed into the liquid crystal cell. Accordingly, in the process of manufacturing the liquid crystal cell, it may be possible to avoid forming conductive metal layers on both sides of the first substrate 10, thereby reducing the difficulty of the production process and improving the production efficiency. When bonding on the side of the first substrate 10 away from the liquid crystal layer 30 after forming the liquid crystal cell, the bonding accuracy requirement of the overall third substrate 60 and the external metal layer 40 may be reduced, thereby reducing the difficulty of bonding and further reducing the manufacturing cost.

It is understandable that the third substrate 60 of this embodiment may be one of a flexible substrate, or a rigid substrate. For example, the material of the third substrate 60 may be any rigid/hard material including glass and ceramic, or it may also be any kind of flexible material including polyimide and silicon nitride. Because the above-mentioned materials may not absorb microwave signal, that is, the insertion loss in the microwave frequency band may be relatively small, it may be beneficial to reduce the signal insertion loss and may greatly reduce loss the microwave signal during the transmission.

In one embodiment, after the external metal layer 40 is set, the specific positions of the third substrate 60 and the external metal layer 40 on the side of the first substrate 10 away from the liquid crystal layer 30 may not be limited. As shown in FIG. 1 and FIG. 14, after the liquid crystal antenna of this embodiment is fabricated, the external metal layer 40 may be bonded and fixed on the surface of the first substrate 10 facing away from the second substrate 20, and the third substrate 60 may be disposed on the side of the external metal layer 40 facing away from the first substrate. For example, the external metal layer 40 may be disposed between the first substrate 10 and the third substrate 60.

Figure 15:
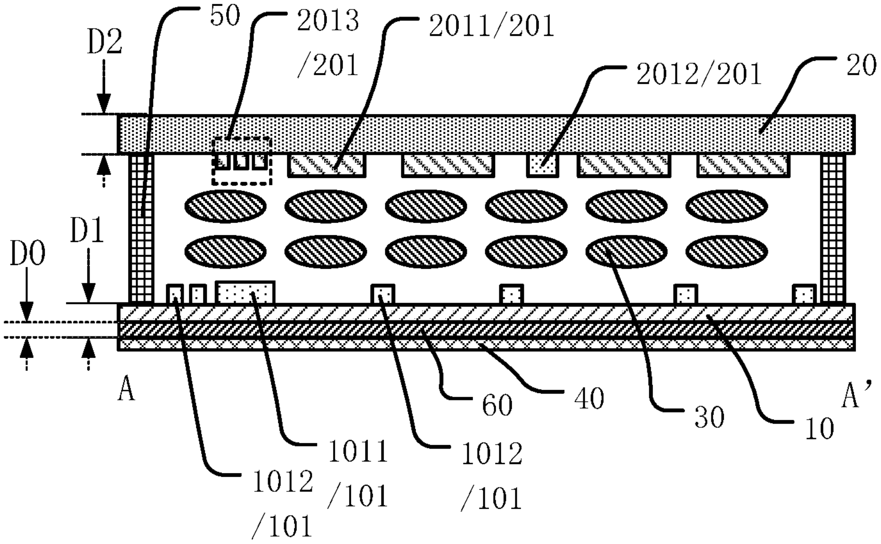
FIG. 15 illustrates another exemplary A-A'-sectional view of the exemplary liquid crystal antenna in FIG. 1.

FIG. 15 is another exemplary A-A'-sectional view of the exemplary liquid crystal antenna in in FIG. 1. As shown in FIG. 15 and referring to FIG. 1, after the liquid crystal antenna is fabricated, the third substrate 60 may be bonded and fixed on the side of the first substrate 10 facing away from the second substrate 20, and the external metal layer 40 may be disposed on the side of the third substrate 60 facing away from the first substrate 10. For example, the third substrate 60 may be disposed between the first substrate 10 and the external metal layer 40.

In one embodiment, when the third substrate 60 is disposed between the first substrate 10 and the external metal layer 40, the total thickness D1 of the third substrate 60 and the first substrate 10 after being bonded and fixed may be equal to the thickness D2 of the second substrate 20.

In one embodiment, the third substrate 60 may be bonded and fixed on the side of the first substrate 10 facing away from the second substrate 20, and the external metal layer 40 may be disposed on the side of the third substrate 60 facing away from the first substrate 10. That is, when the third substrate 60 is disposed between the first substrate 10 and the external metal layer 40, the sum of the thicknesses D1 of the third substrate 60 and the first substrate 10 after being bonded and fixed may be equal to the thickness D2 of the second substrate 20 such that the third substrate 60 used as the carrier of the external metal layer 40 may have a sufficient strength, and on the premise of ensuring the strength, the third substrate 60 and the first substrate 10 after being bonded and fixed as a whole may be thinned as much as possible, and may have a same, or similar thickness as the second substrate 20. Accordingly, the increase of the insertion loss of high-frequency signals caused by the excess large total thickness D1 of the third substrate 60 and the first substrate 10 after being bonded and fixed as a whole may be avoided. Thus, the gain of the liquid crystal antenna may be increased; and the signal insertion loss may be decreased.

Figure 16:
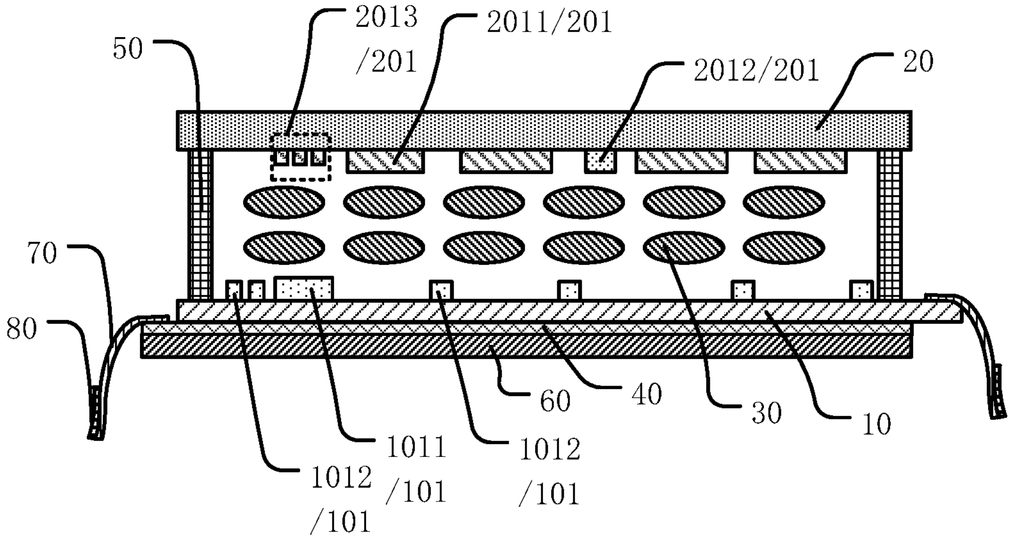
FIG. 16 illustrates an exemplary structure after the liquid crystal antenna is bonded with a driving circuit in FIG. 14.

It is understandable that when the liquid crystal antenna of this embodiment needs to be bonded with a driving chip to provide driving signals, the driving chip 70 may be fixed to the flexible circuit board 80 and connected to the substrate of the liquid crystal antenna through the flexible circuit board 80. FIG. 16 is a schematic diagram of the structure of the liquid crystal antenna in FIG. 14 after the driving chip is bonded.

As shown in FIG. 16, the third substrate 30 and the external metal layer 40 may extend beyond the first substrate 10 for bonding and connecting with the driving chip 70. The liquid crystal cell formed by the first substrate 10 and the second substrate 20 may independently use the driving chip. As shown in FIG. 16, the first substrate 10 may extend beyond the second substrate 20 for bonding the driving chip 60 used to provide the driving signal for the liquid crystal cell.

Figure 17:
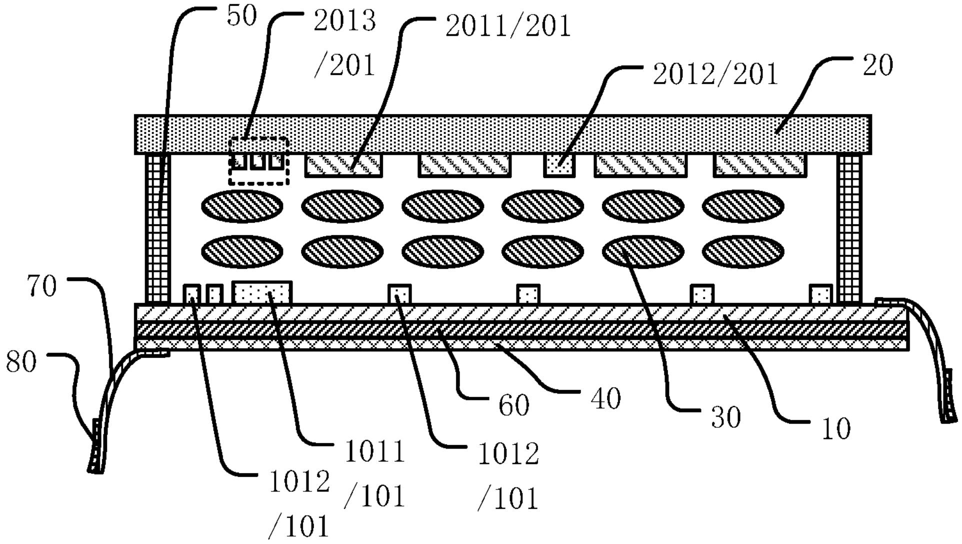
FIG. 17 illustrates an exemplary structure after the liquid crystal antenna is bonded with a driving circuit in FIG. 15.

FIG. 17 is a schematic diagram of the structure of the liquid crystal antenna in FIG. 15 after the driving chip is bonded. As shown in FIG. 17, the third substrate 30 and the external metal layer 40 may be flush with the edge of the first substrate 10. The flexible circuit board 80 connected with the driving chip 70 may be directly bonded to the side of the external metal layer 40 facing away from the third substrate 60, and the liquid crystal cell formed by the first substrate 10 and the second substrate 20 may independently use the driving chip 70. As shown in FIG. 17, the portion of the first substrate 10 that extends beyond the second substrate 20 may be used to bond the driving chip 70 that provides driving signals for the liquid crystal cell.

It should be noted that this embodiment is only an example of a structure after the liquid crystal antenna is bonded to the driving chip, including but not limited to this, and other structures may also be possible, and this embodiment will not be repeated here.

In some embodiments, referring to FIG. 1, FIG. 14 and FIG. 15, the external metal layer 40 may be a copper layer structure, and the third substrate 60 may be a printed circuit board.

The external metal layer 40 provided on the outside of the liquid crystal cell formed by the first substrate 10 and the second substrate 20 may be a copper layer structure, and the third substrate 60 may be a printed circuit board (PCB). The third substrate 60 and the external metal layer 40, which are directly connected and fixed to each other, may be formed by copper coating on the printed circuit board. The circuit structure in the printed circuit board itself may directly provide a fixed potential signal to the external metal layer 40 through the circuit structure layer, and because, comparing with a third substrate of glass, the thickness of the third substrate 60 of the printed circuit board may be smaller, which may be beneficial to avoid that the total thickness of the third substrate 60 and the first substrate 10 after being bonded and fixed as a whole may be too large, which may cause the increase of the insertion loss of the high-frequency signal. Thus, the gain of the liquid crystal antenna may be increased, and the signal insertion loss may be decreased.

In one embodiment, as shown in FIG. 1 and FIG. 15, the third substrate 60 may also be made of other materials, and may only need to satisfy that the thickness D0 of the third substrate 60 is smaller than the thickness D2 of the second substrate 20 such that the sum of the thickness D1 of the third substrate 60 bonded on the first substrate 10 may meet the requirement of being similar to or equal to the thickness D2 of the second substrate 20, which may provide favorable conditions for the liquid crystal antenna to reduce signal insertion loss.

Figure 18:
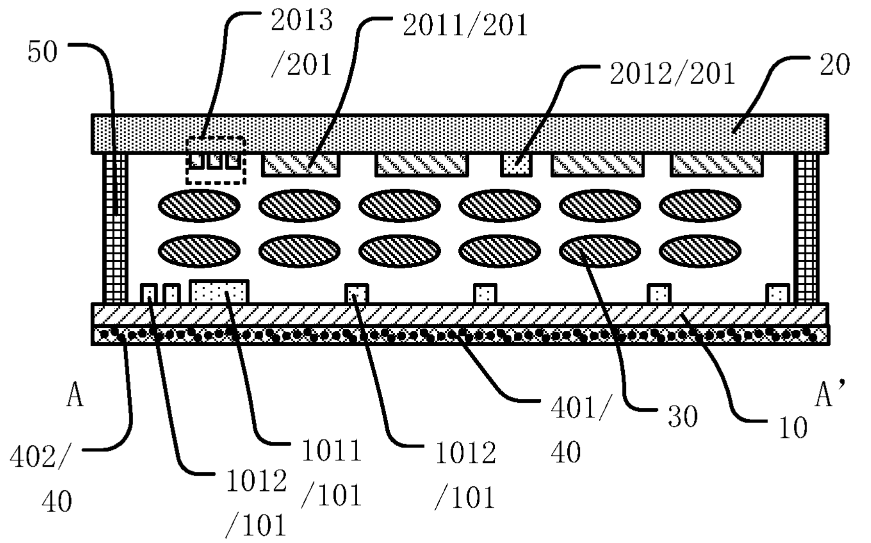
FIG. 18 illustrates another exemplary A-A'-sectional view of the exemplary liquid crystal antenna in FIG. 1.
Figure 19:
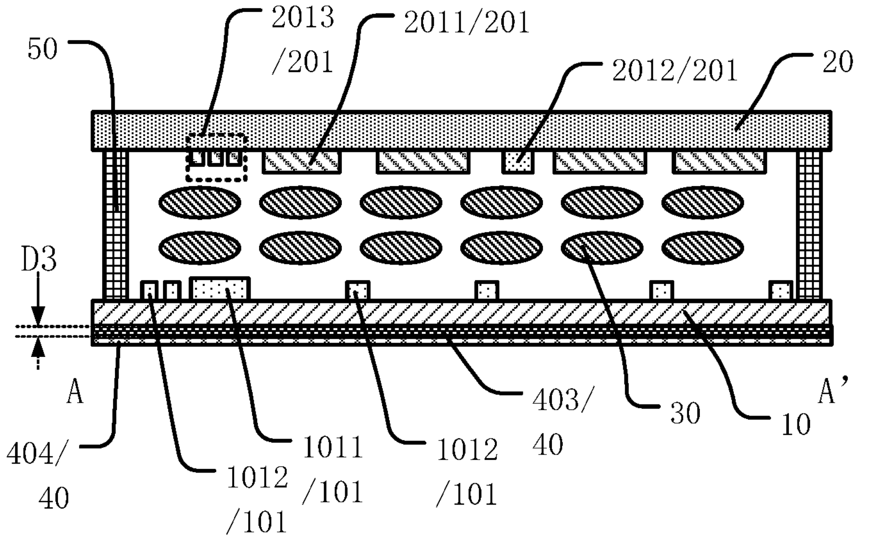
FIG. 19 illustrates another exemplary A-A'-sectional view of the exemplary liquid crystal antenna in FIG. 1.

FIG. 18 is a schematic diagram of another exemplary A-A'-sectional view of the exemplary liquid crystal antenna in FIG. 1. FIG. 19 is a schematic diagram of another exemplary A-A'-sectional view of the exemplary liquid crystal antenna in FIG. 1. As shown in FIGS. 18-19 and referring to FIG. 1, in some embodiments, the external metal layer 40 may be made of a copper adhesive. The copper adhesive may be attached on the side of the first substrate 10 facing away from the second substrate 20, thereby helping to reduce the difficulty of the manufacturing process.

As shown FIG. 1 and FIG. 18, the copper adhesive may include a first adhesive layer 401, and the first adhesive layer 401 may be doped with copper particles 402. For example, the external metal layer 40 may have its own adhesive colloid, namely the first adhesive layer 401, and a certain number of copper particles 402 may be doped in the first adhesive layer 401 such that the external metal layer 40 may be directly attached on the side of the first substrate 10 facing away from the second substrate 20. At the same time, the doped copper particles 402 may also ensure the conductivity of the external metal layer 40. In one embodiment, the first adhesive layer 401 doped with copper particles 402 may be self-adhesive and may be directly attached and fixed on the first substrate 10 to better reduce the thickness of the external metal layer 40. Thus, the overall thickness of the liquid crystal antenna may be reduced. It can be understood that this embodiment does not specifically limit the number, particle size, and volume of the copper particles 402 doped in the first adhesive layer 401, and it may only need to satisfy that the external metal layer 40 is a copper adhesive, and at the same time meet the viscosity and conductivity.

As shown in FIG. 1 and FIG. 19, the copper adhesive may include a second adhesive layer 403 and a copper foil layer 404. The second adhesive layer 403 may be disposed on the side of the copper foil layer 404 adjacent to the first substrate 10. The second adhesive layer 403 may be bonded and fixed on the first substrate 10, and the thickness D3 of the second adhesive layer 403 may be less than or equal to 100 μm. For example, the external metal layer 40 may be a fixed structure of the second adhesive layer 40 and the copper foil layer 404 with self-adhesiveness. The copper foil layer 404 itself may have a relatively small thickness, and the thickness D3 of the second adhesive layer 403 is less than or equal to 100 μm. Accordingly, the thickness of the external metal layer 40 as a whole may be reduced, and there may be no need to provide other carrier substrates to be fixed and attached to the first substrate 10. Thus, the overall thickness of the liquid crystal antenna may be reduced.

Figure 20:
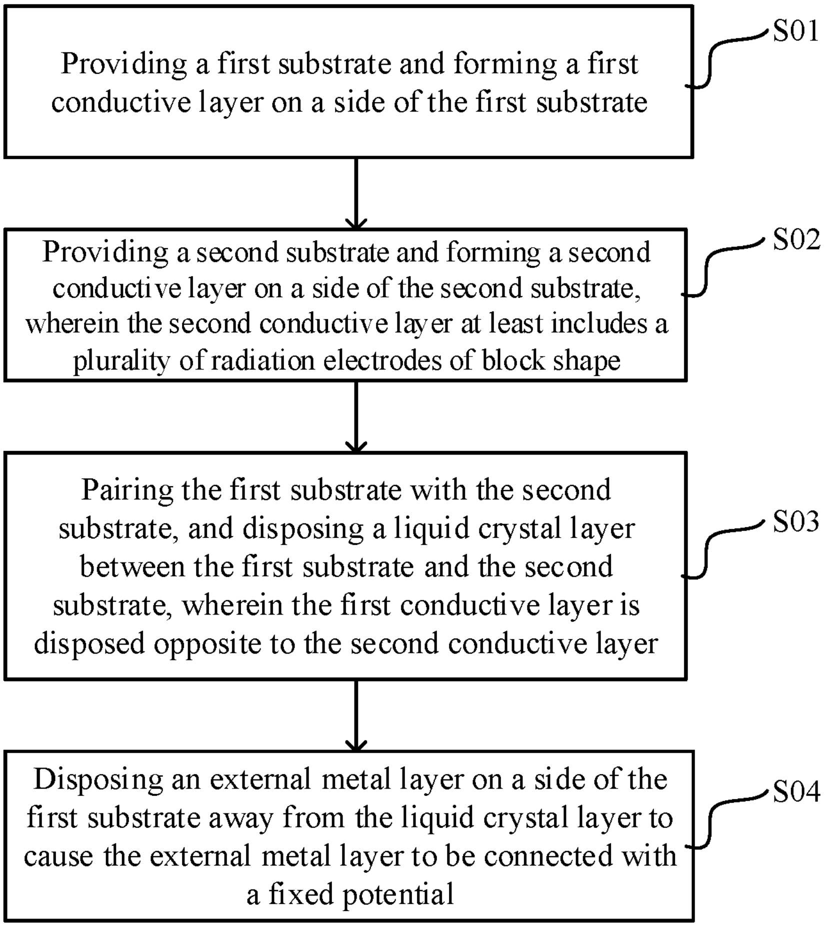
FIG. 20 illustrates a flow chart of an exemplary fabrication method of a liquid crystal antenna according to various disclosed embodiments of the present disclosure.
Figure 21:
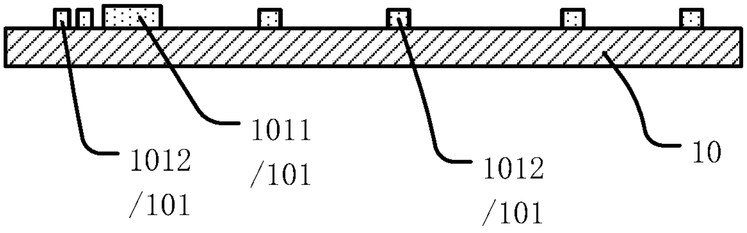
FIG. 21 illustrates an exemplary structure formed by the method in FIG. 20 after forming the first conductive structure.
Figure 22:
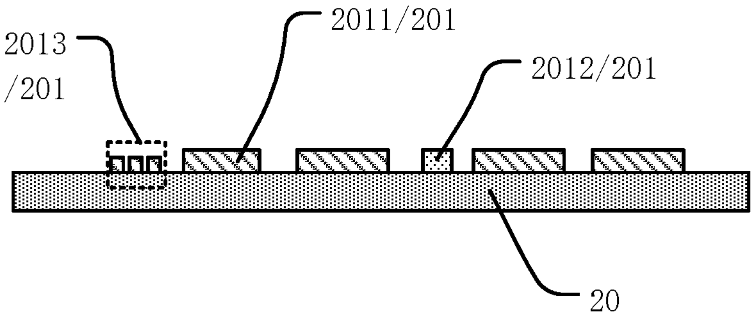
FIG. 22 illustrates an exemplary structure formed by the method in FIG. 20 after forming the second conductive structure.
Figure 23:
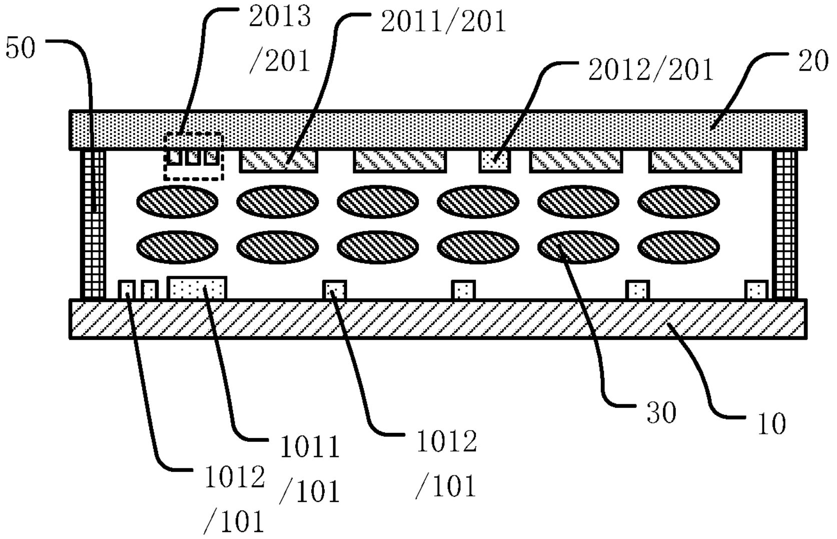
FIG. 23 illustrates an exemplary structure formed by the method in FIG. 20 after pairing the first substrate and the second substrate.
Figure 24:
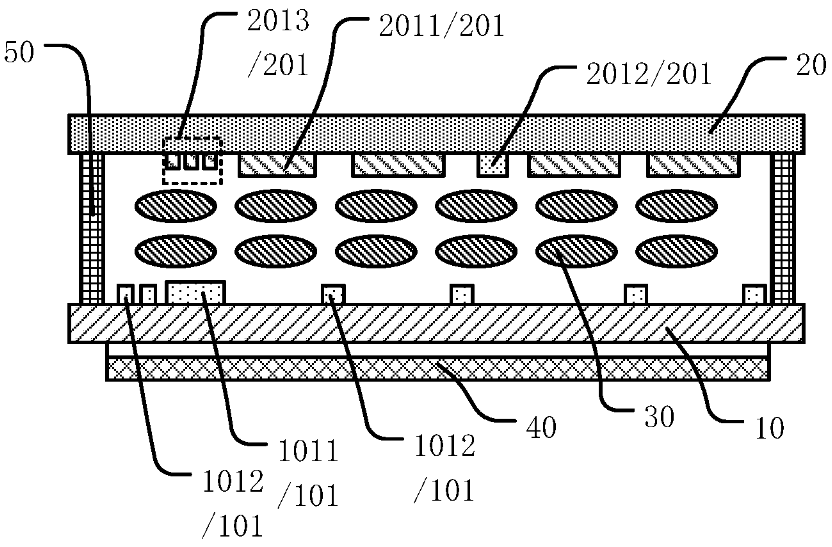
FIG. 24 illustrates an exemplary structure formed by the method in FIG. 20 after forming the external metal layer.

The present disclosure also provides a method for forming a liquid crystal antenna. FIG. 20 is a flowchart of an exemplary method for forming a liquid crystal antenna according to various disclosed embodiments of the present disclosure. FIG. 21 is a schematic diagram of the structure after the first conductive layer is fabricated in the forming method of the liquid crystal antenna in FIG. 20. FIG. 22 is a schematic diagram of the structure after the second conductive layer is fabricated in the forming method of a liquid crystal antenna in FIG. 20. FIG. 23 is a schematic diagram of the structure after the first substrate and the second substrate are assembled into a liquid crystal cell in the forming method of a liquid crystal antenna in FIG. 20. FIG. 24 is the schematic diagram of the structure after the external metal layer is formed in the forming method of a liquid crystal antenna in FIG. 20. The method may be used to form the present disclosed liquid crystal antenna.

As shown in FIGS. 20-24, and referring to FIGS. 1-5, the fabrication forming the liquid crystal antenna may include:

S01: as shown in FIG. 21, providing a first substrate 10 and forming a first conductive layer 101 on a side of the first substrate 10. In one embodiment, the first conductive layer 101 may be patterned to form the structures required by the liquid crystal antenna on the first substrate 10, and the specific structures may be referred to the description of the embodiments in FIGS. 1-5;

S02: as shown in FIG. 22, providing a second substrate 20 and forming a second conductive layer 201 on a side of the second substrate 20. In one embodiment, the second conductive layer 101 may be patterned to form the structures required by the liquid crystal antenna on the second substrate 20. For example, the second conductive layer 201 may at least include a plurality of block-shaped radiation electrodes 2011. The specific structures may be referred to the description of the embodiments in FIGS. 1-5;

S03: as shown in FIG. 23, pairing the first substrate 10 and the second substrate 20 and disposing the liquid crystal layer 30 such that the liquid crystal layer 30 may be included between the first substrate 10 and the second substrate 20, and the first conductive layer 101 and the second conductive layer 201 may be arranged opposite to each other. In one embodiment, the frame sealant 50 may be coated on the first substrate 10, and then the liquid crystal may be dispersed by the liquid crystal injection technology, and the first substrate 10 and the second substrate 20 may be aligned and bonded according to the alignment marks on the second substrate 20. After curing the frame sealant 50 to cause the first substrate 10 and the second substrate 20 to have a stable bonding, the liquid crystal cell may be obtained; and S04: as shown in FIG. 24, fabricating an external metal layer 40 on the side of the first substrate 10 facing away from the liquid crystal layer 30 such that the external metal layer 40 is connected to a fixed potential.

The fabrication method provided in this embodiment may be used to form the liquid crystal antenna in the above-mentioned embodiments. The figure in this embodiment only illustrates the structure that may be fabricated by the first conductive layer 101 and the second conductive layer 201 to realize the antenna function, including but not limited to this.

In the manufacturing method of this embodiment, only the side of the first substrate 10 facing toward the second substrate 20 may be provided with the first conductive layer 101, and only the side of the second substrate 20 facing toward the first substrate 10 may be provided with the second conductive layer 201. The radiation electrodes 2011 may also be disposed in the liquid crystal cell. For example, the structures may be integrated in the liquid crystal cell, and the structures used to realize the antenna function may only be disposed on one side of the same substrate. Thus, the introduction of the process of fabricating conductive layers on both sides of the substrate of the liquid crystal antenna during the fabrication of the liquid crystal antenna may be avoided. For example, in this embodiment, it may not be necessary to use the process of fabricating and patterning conductive metal layers on both sides of a substrate. Thus, the need for fabricating a conductive structure on one side of the substrate and then turning it over on the other side surface, and exposing, developing and etching may be eliminated. Accordingly, the manufacturing difficulty and manufacturing cost may be reduced, and the production efficiency and the product yield may be improved.

In the fabrication method of this embodiment, the external metal layer 40 may be a structure that is additionally formed on the side of the first substrate 10 facing away from the liquid crystal layer 30 after the first substrate 10 and the second substrate 20 are formed into the liquid crystal cell. Thus, in the process of fabricating the liquid crystal cell, the process for forming conductive metal layers on two sides of the first substrate 10 may be avoided. Accordingly, the difficulty of the production process may be reduced; and the production efficiency may be improved. In one embodiment, the external metal layer 40 may be disposed on the entire surface of the first substrate 10 on the side of the first substrate 10 facing away from the liquid crystal layer 30 after the liquid crystal cell is formed, and the external metal layer 40 may be connected to a fixed potential. It can be understood that the specific potential value of the external metal layer 40 connected to the fixed potential may not be specifically limited in this embodiment, and it may be selected and set according to actual requirements during specific implementation.

The external metal layer 40 of this embodiment may not only be used as a reflective layer, but when the microwave signal is phase-shifted, it may ensure that the microwave signal only propagates in the liquid crystal cell of the liquid crystal antenna during the phase-shifting process and prevent it from diverging outside the liquid crystal antenna. When the microwave signal is transmitted to the external metal layer 40, the microwave signal may be reflected back through the entire surface of the external metal layer 40. The external metal layer 40 connected to the fixed potential may also be configured to shield external signals to avoid external signals to interfere with the microwave signal to ensure the accuracy of the phase shift of the microwave signal; and the radiation gain of the antenna may be increased. Moreover, because the external metal layer 40 of this embodiment may be a whole surface structure, after being disposed on the side of the first substrate 10 facing away from the liquid crystal layer 30 after the formation of the liquid crystal cell, the requirements of the bonding accuracy may be reduced. Thus, the manufacturing difficulty may be reduced, and the manufacturing costs may be reduced.

Figure 25:
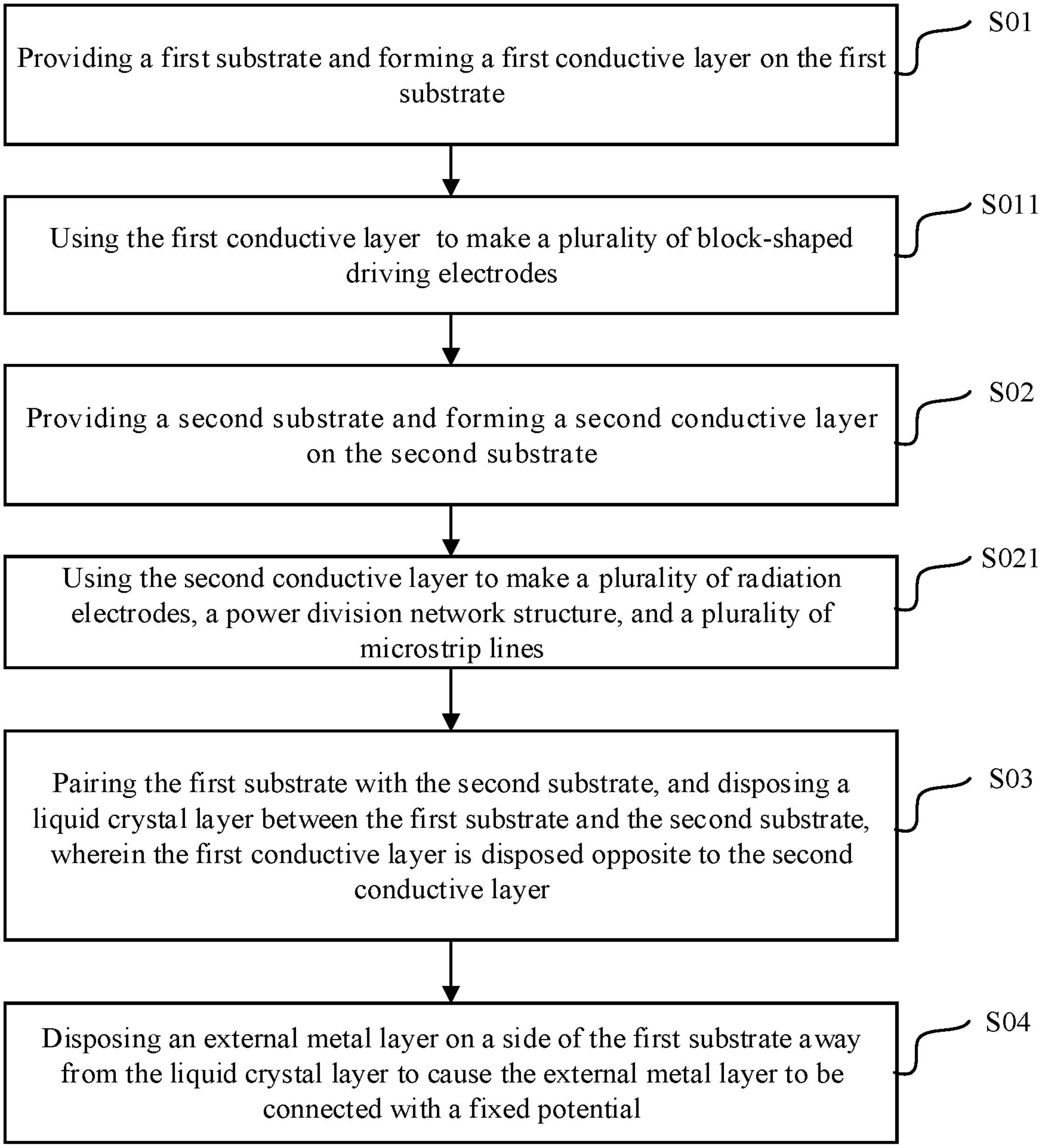
FIG. 25 illustrates a flow chart of another exemplary fabrication method of a liquid crystal antenna according to various disclosed embodiments of the present disclosure.

FIG. 25 is a flowchart of another exemplary method for forming a liquid crystal antenna according to various disclosed embodiments of the present disclosure. As shown in FIG. 25 and referring to FIGS. 1-8, and FIGS. 20-24, a plurality of first conductive layers 101 may be formed on a side of the first substrate 10. The method may also include S011: patterning the first conductive layer 101 and using the first conductive layer 101 to make a plurality of block-shaped driving electrodes 1011; and forming the second conductive layer 201 on one side of the second substrate 20. The method may further include: S021, patterning the second conductive layer 201 and using the second conductive layer 201 to form a plurality of radiation electrodes 2011, a power division network structure 2012, and a plurality of microstrip lines 2013. The power division network structure 2012 may be connected to the signal input signal 2014. One end of the microstrip line 2013 may be connected to the power division network structure 2012, and the other end of the microstrip line 2013 may be connected to the radiation electrode 2011 respectively. The orthographic projection of the driving electrode 1011 on the second substrate 20 and the microstrip line 2013 may at least partially overlap.

In one embodiment, the first conductive layer 101 on the side of the first substrate 10 facing toward the second substrate 20 may be patterned to form the plurality of driving electrodes 1011. The plurality of block-shaped driving electrodes 1011 may be uniformly distributed on the first substrate 10 as an array. The driving electrodes 1011 may be connected to an external power supply terminal through at least one bias voltage signal line 1012, and each driving electrode 1011 may independently control the liquid crystal antenna by at least one bias voltage signal line 1012. For example, the bias voltage signal line 1012 may be used to transmit the voltage signal provided by the external power supply terminal to the driving electrode 1011 to control the deflection electric field of the liquid crystal molecules of the liquid crystal layer 30 between the first substrate 10 and the second substrate 20. The second conductive layer 201 on the side of the second substrate 20 facing toward the first substrate 10 may be patterned to fabricate a plurality of radiation electrodes 2011, a power division network structure 2012, and a plurality of microstrip lines 2013 connected to the power division network structure 2012. One end of the power division network structure 2012 may be connected to the signal input terminal 2014. In one embodiment, the signal input terminal 2014 may be inserted into the signal input rod 2014A, and fixed by the coaxial cable connector 2014B. The signal input rod 2014A may be used to input the microwave signal and transmitted the microwave signal to the power division network structure 2012 through the signal input terminal 2014. The power division network structure 2012 may be a one-transmit-to-multiple network structure. One end of the microstrip line 2013 may be connected to the power division network structure 2012. Therefore, through the power division network structure 2012, the microwave signal input by the signal input terminal 2014 may be simultaneously transmitted to each microstrip line 2013. The orthographic projection of the driving electrode 1011 on the second substrate 20 and the microstrip line 2013 may at least partially overlap. For example, the driving electrode 1011 and the microstrip line 2013 may be in a one-to-one correspondence on the first substrate 10 and the second substrate 20 for generating the electric field that drives the deflection of the liquid crystal molecules of the liquid crystal layer 30. By controlling the voltage signal transmitted to the driving electrode 1011 through the bias voltage signal line 1012, the intensity of the electric field formed between the microstrip line 2013 and the driving electrode 1011 may be controlled to adjust the deflection angle of the liquid crystal molecules of the liquid crystal layer 30 in the corresponding space; and the dielectric constant of the liquid crystal layer 30 may be changed to realize the phase shift of the microwave signal in the liquid crystal layer 30 and achieve the effect of changing the phase of the microwave. The other end of the microstrip line 2013 may be respectively connected to the radiation electrodes 2011. After the phase shift of the microwave signal is completed, the phase-shifted microwave signal may be transmitted to the radiation electrode 2011 through the microstrip line 2013, and the microwave signal of the liquid crystal antenna may be radiated out through the radiation electrodes 2011. In one embodiment, the microstrip line may be provided with a common voltage.

Figure 28:
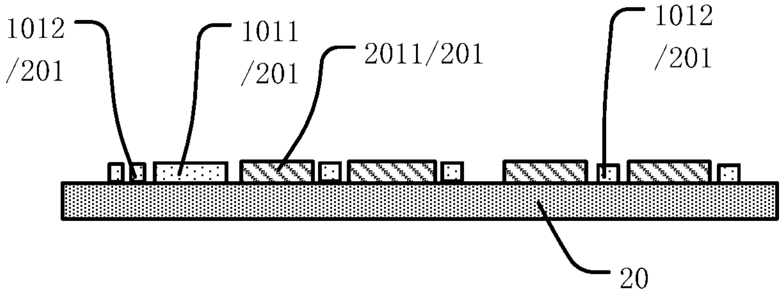
FIG. 28 illustrates an exemplary structure formed by the method in FIG. 26 after forming the second conductive structure.
Figure 29:
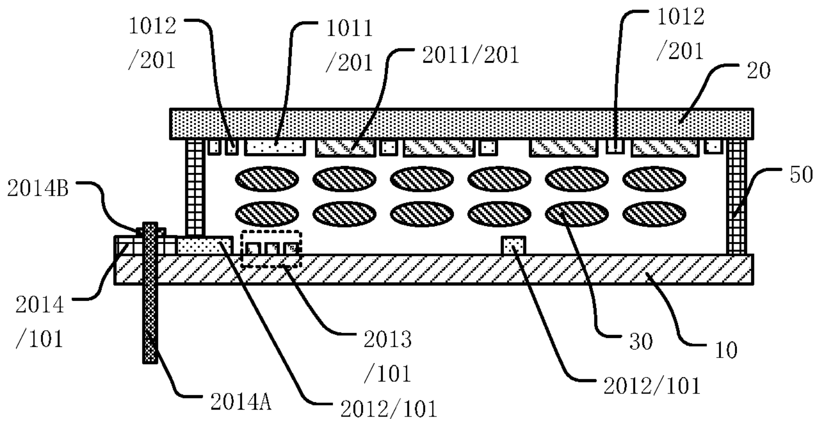
FIG. 29 illustrates an exemplary structure formed by the method in FIG. 26 after pairing the first substrate and the second substrate.
Figure 30:
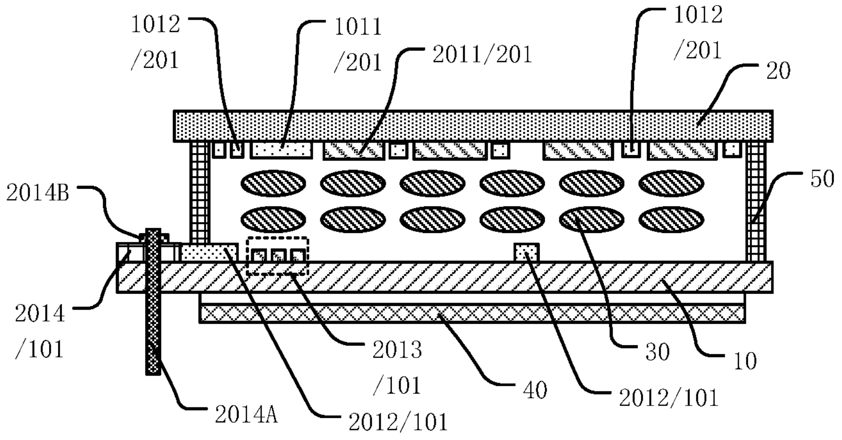
FIG. 30 illustrates an exemplary structure formed by the method in FIG. 26 after forming the external metal layer.

FIG. 26 is a flowchart of another exemplary fabrication method of a liquid crystal antenna according to various disclosed embodiments of the present disclosure. FIG. 27 is the schematic diagram of the structure after the first conductive layer is fabricated in the method provided in FIG. 26. FIG. 28 is the schematic diagram of the structure after the second conductive layer is fabricated in the method provided in FIG. 26. FIG. 29 is the schematic diagram of the structure after the first substrate and the second substrate are paired in the method provided in FIG. 26. FIG. 30 is the structure diagram of the structure after the external metal layer is fabricated in the method provided in FIG. 26. The fabrication method of the liquid crystal antenna may be used to fabricate the liquid crystal antenna provided in the embodiment of FIGS. 9-13.

As shown in FIGS. 26-30 and referring to FIGS. 9-13, the fabrication method may include:

- S11: providing a first substrate 10 and forming a first conductive layer 101 on a side of the first substrate 10;
- S111: as shown in FIG. 27, performing a patterning process on the first conductive layer 101, and using the first conductive layer 101 to form a power division network structure 2012 and a plurality of microstrip lines 2013. The details may be referred to the description of the embodiments in FIGS. 9-13;
- S12: providing a second substrate 20 and forming a second conductive layer 201 on a side of the second substrate 20;
- S121: as shown in FIG. 28, performing a patterning process on the second conductive layer 201, and using the second conductive layer 201 to form a plurality of block-shaped radiation electrodes 2011 and a plurality of block-shaped driving electrodes 1011. The driving electrodes 1011 and the radiation electrodes 2011 may be insulated from each other. The power division network structure 2012 may be connected to the signal input terminal 2014, and one end of the microstrip line 2013 may be connected to the power division network structure 2012. The details may be referred to the description of the embodiments in FIGS. 9-13;

S13: as shown in FIG. 29, pairing the first substrate 10 and the second substrate 20, and disposing the liquid crystal layer 30 such that the liquid crystal layer 30 may be included between the first substrate 10 and the second substrate 20, and the first conductive layer 101 and the second conductive layer 201 may be arranged opposite to each other. In one embodiment, the frame sealant 50 may be coated on the first substrate 10, and then the liquid crystal may be dispersed by the liquid crystal injection technology, and the first substrate 10 and the second substrate 20 may be aligned and attached according to the alignment marks on the second substrate 20. Then, the frame sealant 50 may be cured such that the first substrate 10 and the second substrate 20 may be attached stably to obtain a liquid crystal cell. The orthographic projection of the microstrip line 2013 on the second substrate 20 and the driving electrode 1011 may at least partially overlap; and S14: as shown in FIG. 30, forming an external metal layer 40 on the side of the first substrate 10 facing away from the liquid crystal layer 30 such that the external metal layer 40 may be connected to a fixed potential.

In one embodiment, the first conductive layer 101 on the side of the first substrate 10 facing toward the second substrate 20 may be patterned to form a power division network structure 2012, and a plurality of microstrip lines 2013. One end of the power division network structure 2012 may be connected to the signal input terminal 2014. In one embodiment, the signal input terminal 2014 may be inserted into a signal input rod 2014A and fixed by a coaxial cable connector 2014B. The signal input rod 2014A may be used to input microwave signal and the microwave signal may be transmitted to the power division network structure 2012 through the signal input terminal 2014. The power division network structure 2012 may be a one-transmit-to-multiple network structure. One end of the microstrip line 2013 may be connected to the power division network structure 2012. Thus, through the power division network structure 2012, the microwave signal input from the signal input terminal 2014 may be simultaneously transmitted to each microstrip line 2013.

The second conductive layer 201 on the side of the second substrate 20 facing toward the first substrate 10 may be patterned to fabricate a plurality of radiation electrodes 2011 and a plurality of driving electrodes 1011. The driving electrodes 1011 and the radiation electrodes 2011 may be insulated from each other. In one embodiment, the driving electrodes 1011 and the radiation electrodes 2011 may both have a block structure, the driving electrodes 1011 of the block shape may be uniformly distributed on the second substrate 20 in as an array, and the radiation electrodes 2011 of the block shape may also be uniformly distributed on the second substrate 20 in as an array. Further, the second conductive layer 201 may also be used to provide a plurality of bias voltage signal lines 1012. The driving electrode 1011 may be connected to an external power supply terminal through at least one bias voltage signal line 1012. Each driving electrode 1011 may independently control the liquid crystal antenna by at least one bias voltage signal line 1012. For example, the bias voltage signal line 1012 may be used to transmit the voltage signal provided by the external power supply terminal to the drive electrode 1011 to control the electric field for deflecting the liquid crystal molecules of the liquid crystal layer 30 between the first substrate 10 and the second substrate 20. The orthographic projection of the microstrip line 2013 on the second substrate 20 may at least partially overlap the driving electrode 1011. For example, the driving electrode 1011 and the microstrip line 2013 may have a one-to-one correspondence on the first substrate 10 and the second substrate 20 for generating the electric field that drives the deflection of the liquid crystal molecules of the liquid crystal layer 30. By controlling the voltage transmitted to the driving electrode 1011 through the bias voltage signal line 1012, the intensity of the electric field formed between the microstrip line 2013 and the driving electrode 1011 may be controlled to adjust the deflection angle of the liquid crystal molecules of the liquid crystal layer 30 in the corresponding space. Accordingly, the dielectric constant of the liquid crystal layer 30 may be changed to realize the phase shift of the microwave signal in the liquid crystal layer 30 and to achieve the effect of changing the phase of the microwave. After the phase shift of the microwave signal is completed, the phase shifted microwave signal may be coupled to the radiation electrode 2011 on the second substrate 20 through the microstrip line 2013 on the first substrate 10, and the microwave signal of the liquid crystal antenna may be radiated out through the radiation electrodes 2011.

Figure 31:
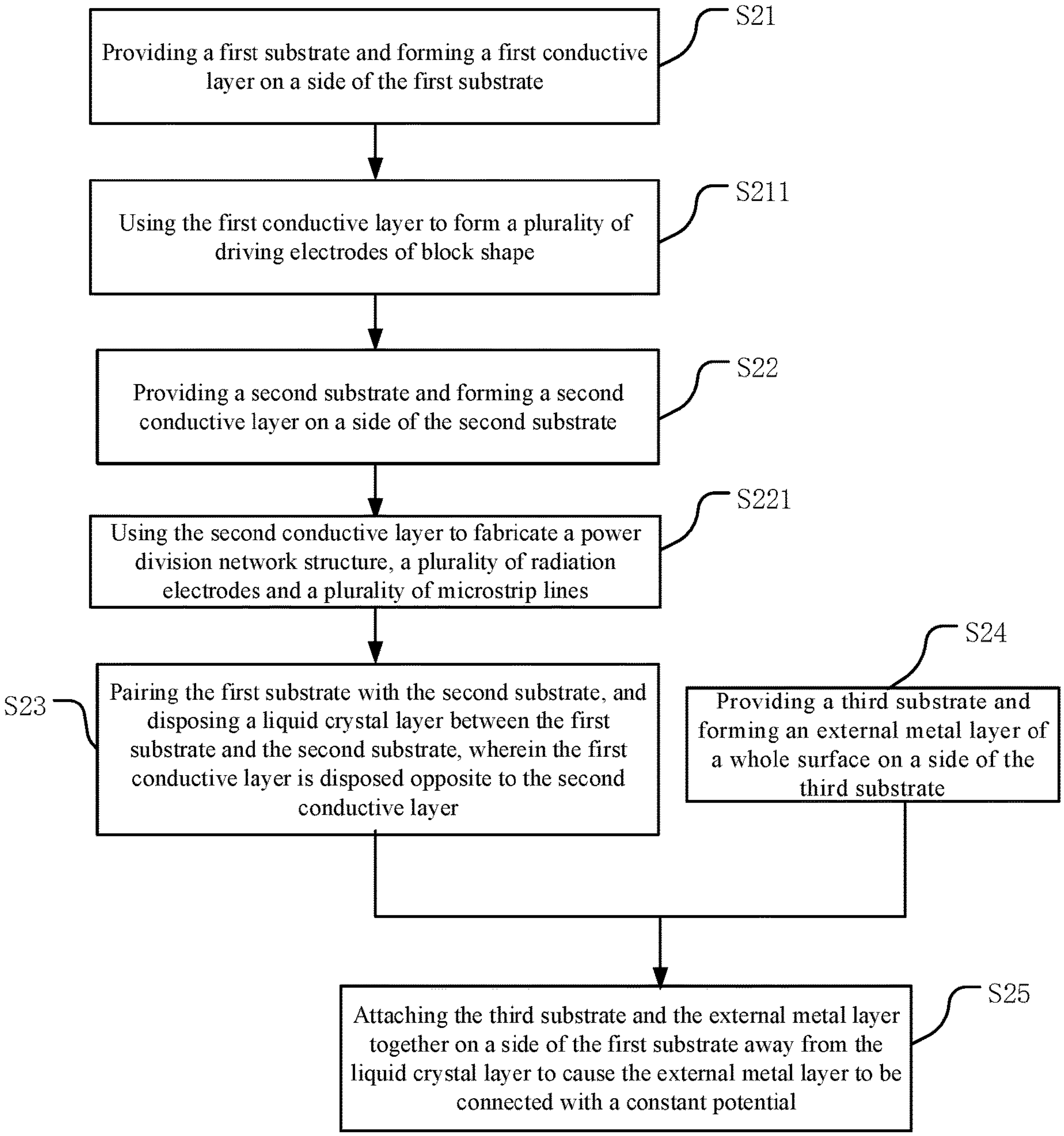
FIG. 31 illustrates a flow chart of another exemplary fabrication method of a liquid crystal antenna according to various disclosed embodiments of the present disclosure.
Figure 32:
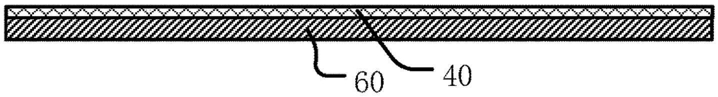
FIG. 32 illustrates an exemplary structure formed by the method in FIG. 31 after forming an external metal layer of whole surface on the third substrate.
Figure 33:
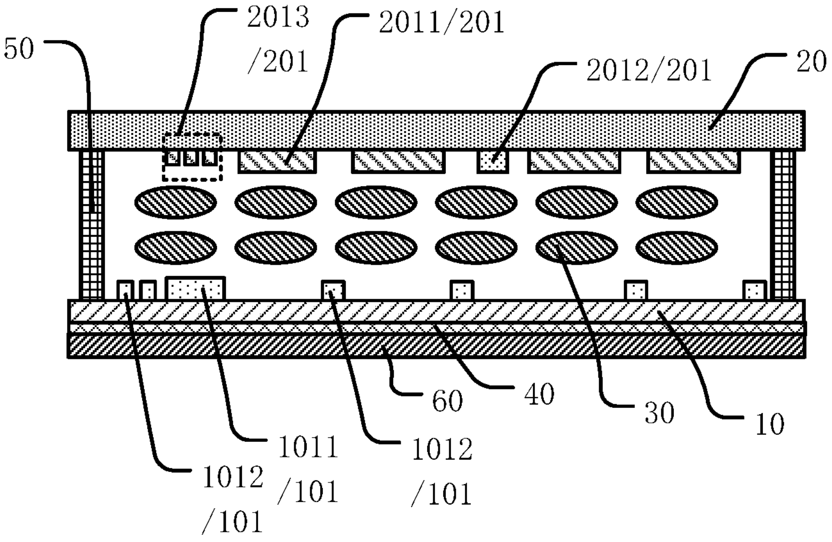
FIG. 33 illustrates an exemplary structure formed by the method in FIG. 31 after forming the external metal layer.
Figure 34:
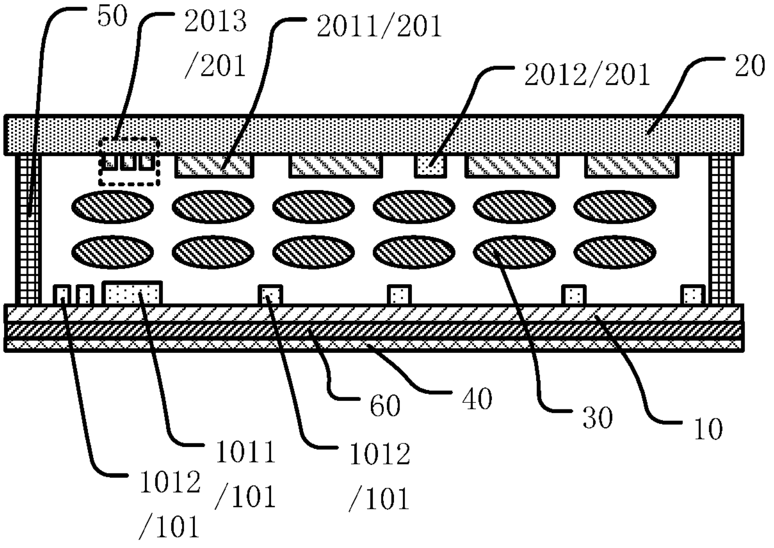
FIG. 34 illustrates another exemplary structure formed by the method in FIG. 31 after forming the external metal layer.

FIG. 31 is a flowchart of another exemplary fabrication method of a liquid crystal antenna according to various disclosed embodiments of the present disclosure. FIG. 32 is the schematic diagram of the structure after an external metal layer of a whole surface structure is fabricated in the method provided in FIG. 31. FIG. 33 is the schematic diagram of the structure after the external metal layer is fabricated in the method provided in FIG. 31. FIG. 34 is the schematic diagram of another structure after the external metal layer is formed in the method provided in FIG. 31. The fabrication method of the liquid crystal antenna may be used to fabricate the liquid crystal antenna provided in the embodiment of FIGS. 14-15.

As shown in FIGS. 31-34 and referring to FIGS. 1-8, FIGS. 14-15, and FIGS. 21-23, in some embodiments, the method for forming a liquid crystal antenna may include:

S21: providing a first substrate 10 and forming a first conductive layer 101 on a side of the first substrate 10;

S211: as shown in FIG. 21, performing a patterning process on the first conductive layer 101, and using the first conductive layer 101 to fabricate a plurality of block-shaped driving electrodes 1011;

S22: providing a second substrate 20 and forming a second conductive layer 201 on s side of the second substrate 20;

S221: as shown in FIG. 22, performing a patterning process on the second conductive layer 201 and using the second conductive layer 201 to fabricate a plurality of radiation electrodes 2011, a power division network structure 2012, and a plurality of microstrip lines 2013. The power division network structure 2012 may be connected to the provided signal input terminal 2014, one end of the microstrip line 2013 may be connected to the power division network structure 2012, and the other end of the microstrip line 2013 may be connected to the radiation electrode 2011, respectively;

S23: as shown in FIG. 23, pairing the first substrate 10 and the second substrate 20, and disposing the liquid crystal layer 30 such that the liquid crystal layer 30 may be located between the first substrate 10 and the second substrate 20, and the first conductive layer 101 and the second conductive layer 201 may be arranged opposite to each other. In one embodiment, the frame sealant 50 may be coated on the first substrate 10, and then the liquid crystal may be dispersed by the liquid crystal injection technology, and the first substrate 10 and the second substrate 20 may be aligned and bonded according to the alignment marks on the second substrate 20. Then, the frame sealant 50 may be cured such that the first substrate 10 and the second substrate 20 may be attached stably to obtain a liquid crystal cell. The orthographic projection of the driving electrode 1011 on the second substrate 20 and the microstrip line 2013 may at least partially overlap;

S24: as shown in FIG. 32, providing a third substrate 60 and forming an external metal layer 40 of a whole surface structure on a side of the third substrate 60; and S25: as shown in FIGS. 33-34, attaching the third substrate 60 and the external metal layer 40 together to the side of the first substrate 10 facing away from the liquid crystal layer 30 such that the external metal layer 40 may be connected to a fixed potential.

In the manufacturing method provided in this embodiment, after the first substrate 10 and the second substrate 20 are formed into the liquid crystal cell, the external metal layer 40, which may be additionally manufactured on the side of the first substrate 10 facing away from the liquid crystal layer 30, may be attached on the third substrate 60. The third substrate 60 may be configured as the carrier substrate of the external metal layer 40 and may be fixed on the side of the first substrate 10 facing away from the liquid crystal layer 30 together with the external metal layer 40. During the manufacturing process, the fixing structure of the third substrate 60 and the external metal layer 40 (as shown in FIG. 32) may be formed in batches first. Then, the fixing structure of the third substrate 60 and the external metal layer 40 may be directly disposed on the side of the first substrate 10 facing away from the liquid crystal layer 30 after the first substrate 10 and the second substrate 20 are formed into a liquid crystal cell. Accordingly, it may be possible to avoid forming conductive metal layers on two sides of the first substrate 10, the difficulty of the production process may be reduced, and the production efficiency may be improved. When the fixing structure of the third substrate 60 and the external metal layer 40 is fixed on the side of the first substrate 10 facing away from the liquid crystal layer 30 after the liquid crystal cell is formed, the overall bonding accuracy requirements of the third substrate 60 and the external metal layer 40 may be reduced, and the production costs may be further reduced.

In one embodiment, as shown in FIG. 33, after the liquid crystal antenna of this embodiment is fabricated, the external metal layer 40 may be attached and fixed on the surface of the first substrate 10 facing away from the second substrate 20, and the third substrate 60 may be located on the side of the external metal layer 40 away from the first substrate 10. For example, the external metal layer 40 may be located between the first substrate 10 and the third substrate 60.

In one embodiment, as shown in FIG. 34, after the liquid crystal antenna of this embodiment is fabricated, the third substrate 60 may be bonded and fixed on the surface of the first substrate 10 facing away from the second substrate 20, and the external metal layer 40 may be located on the side of the third substrate 60 facing away from the first substrate 10. For example, the third substrate 60 may be located between the first substrate 10 and the external metal layer 40. It can be understood that this embodiment does not limit the specific positions of the third substrate 60 and the external metal layer 40 on the side of the first substrate 10 facing away from the liquid crystal layer 30 after the external metal layer 40 is disposed.

Figure 35:
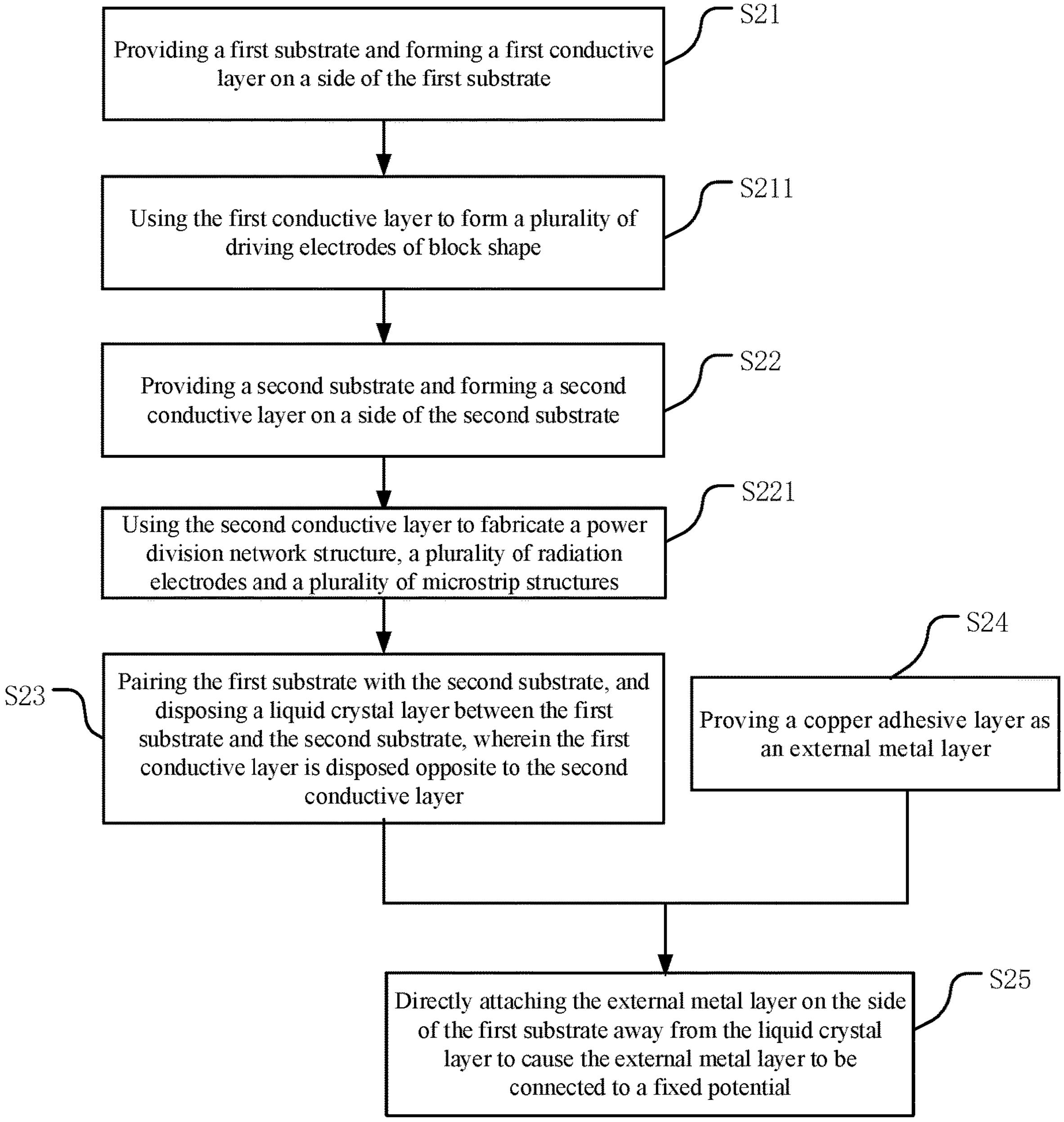
FIG. 35 illustrates a flow chart of another exemplary fabrication method of a liquid crystal antenna according to various disclosed embodiments of the present disclosure.
Figure 36:
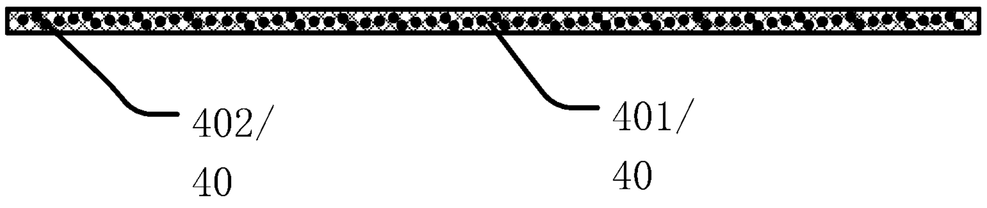
FIG. 36 illustrates an exemplary external metal layer formed by the fabrication method of the liquid crystal antenna in FIG. 35.
Figure 37:
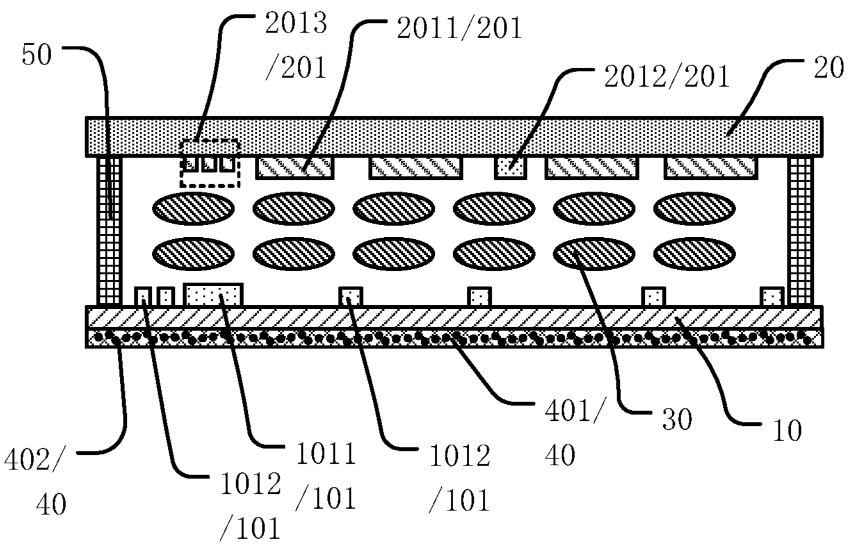
FIG. 37 illustrates an exemplary liquid crystal after forming the external metal layer in the FIG. 36.
Figure 38:
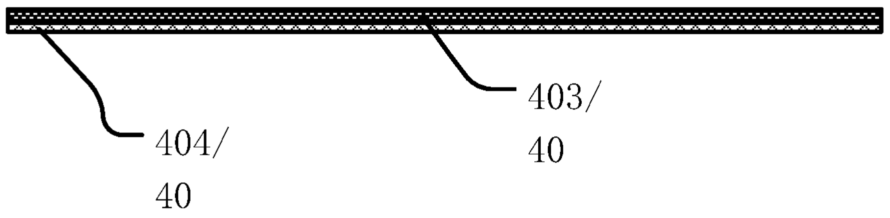
FIG. 38 illustrates an exemplary structure formed by the method in FIG. 35 after forming the external metal layer.
Figure 39:
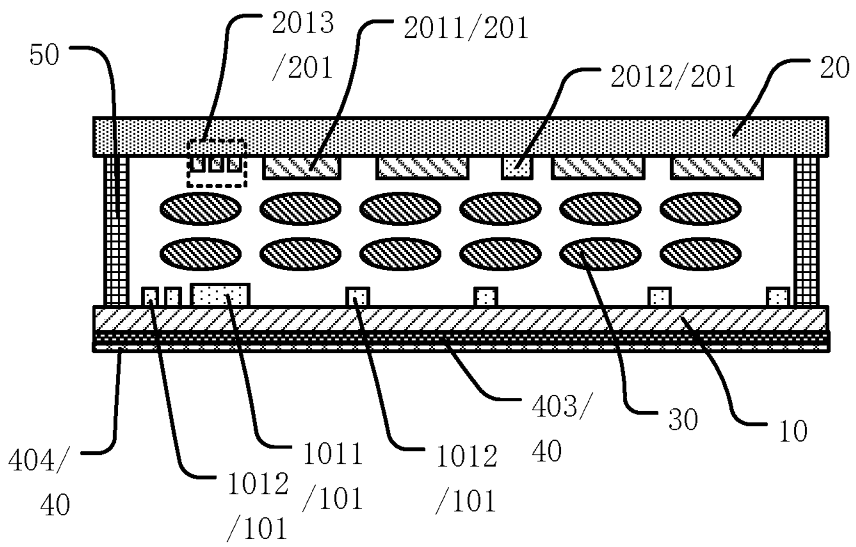
FIG. 39 illustrates an exemplary liquid crystal after forming the external metal layer in the FIG. 36.

FIG. 35 illustrates a flowchart of another exemplary fabrication method of a liquid crystal antenna according to various disclosed embodiments of the present disclosure. FIG. 36 is a schematic structural diagram of the external metal layer provided in the fabrication method of the liquid crystal antenna in FIG. 35. FIG. 37 is a schematic structural diagram of the liquid crystal antenna after the external metal layer is formed by the method in in FIG. 36. FIG. 38 is another schematic diagram of the external metal layer provided in the fabrication method of the liquid crystal antenna in FIG. 35. FIG. 39 is a schematic diagram of the liquid crystal antenna after the external metal layer in FIG. 38 is formed. The method may be used to form the liquid crystal antenna of the embodiment of FIG. 18 and FIG. 19.

As shown in FIGS. 35-39 and referring to FIGS. 1-8, FIGS. 18-19 and FIGS. 21-23, the method for forming the liquid crystal antenna may include:

S31: providing a first substrate 10, and forming a first conductive layer 101 on a side of the first substrate 10;

S311: referring to FIG. 21, performing a patterning process on the first conductive layer 101, and using the first conductive layer 101 to fabricate a plurality of block-shaped driving electrodes 1011;

S32: providing a second substrate 20, and forming a second conductive layer 201 on a side of the second substrate 20;

S321: referring to FIG. 22, performing a patterning process on the second conductive layer 201, and using the second conductive layer 201 to fabricate a plurality of radiation electrodes 2011, a power division network structure 2012, and a plurality of microstrip lines 2013. The power division network structure 2012 may be connected to the provided signal input terminal 2014. One end of the microstrip line 2013 may be connected to the power division network structure 2012, and the other end of the microstrip line 2013 may be connected to the radiation electrode 2011, respectively;

S33: pairing the first substrate 10 and the second substrate 20, and disposing the liquid crystal layer 30 such that the liquid crystal layer 30 may be included between the first substrate 10 and the second substrate 20, and the first conductive layer 101 and the second conductive layer 201 may be arranged opposite to each other. In one embodiment, the frame sealant 50 may be coated on the first substrate 10, and then the liquid crystal may be dispersed by the liquid crystal injection technology, and the first substrate 10 and the second substrate 20 may be aligned and bonded according to the alignment marks on the second substrate 20. Then, the frame sealant 50 may be cured such that the first substrate 10 and the second substrate 20 may be attached stably to obtain a liquid crystal cell. The orthographic projection of the driving electrode 1011 on the second substrate 20 and the micro-ribbon line structure 2013 may at least partially overlap;

S34: providing a copper adhesive as the external metal layer 40. As shown in FIG. 36, the copper adhesive may include a first adhesive layer 401, and the first adhesive layer 401 may be doped with copper particles 402. As shown in FIG. 38, the copper adhesive may include a second adhesive layer 403 and a copper foil layer 404, and the thickness of the second adhesive layer 403 may be less than or equal to 100 μm; and S35: as shown in FIG. 37 and FIG. 39, directly attaching the external metal layer 40 of the copper adhesive on the surface of the first substrate 10 facing away from the liquid crystal layer 30 such that the external metal layer 40 may be connected to a fixed potential.

The external metal layer 40 of this embodiment may be made of a copper adhesive. The copper adhesive may be a structure that includes a first adhesive layer 401 doped with copper particles 402. For example, the external metal layer 40 may include a self-adhesive glue, i.e., the first adhesive layer 401, and a certain amount of copper particles 402 may be doped in the first adhesive layer 401. When the external metal layer 40 is directly attached on the surface of the first substrate 10 away from the second substrate 20, the doped copper particles 402 may also ensure the conductivity of the external metal layer 40. In one embodiment, the first adhesive layer 401 doped with copper particles 402 may be self-adhesive and may be directly attached and fixed on the first substrate 10 to better reduce the thickness of the external metal layer 40. Accordingly, the overall thickness of the liquid crystal antenna may be reduced. It can be understood that this embodiment does not specifically limit the number, particle size, and volume of the copper particles 402 doped in the first adhesive layer 401, and it may only need to satisfy that the external metal layer 40 is a copper adhesive, and at the same time, to meet the viscosity and conductivity.

The copper adhesive may also be a structure including a second adhesive layer 403 and a copper foil layer 404. The thickness of the second adhesive layer 403 may be less than or equal to 100 μm. For example, the external metal layer 40 may be a fixed structure having a self-adhesive second adhesive layer 40 and a copper foil layer 404. The thickness of the copper foil layer 404 itself may be relatively thin, and the thickness of the second adhesive layer 403 may be less than or equal to 100 μm. Thus, the thickness of the external metal layer 40 as a whole may be reduced, and there may be no need to provide other carrier substrate to be attached and fixed with the first substrate 10. Accordingly, the overall thickness of the liquid crystal antenna may be further reduced. In one embodiment, the external metal layer 40 of copper adhesive may be directly attached to the surface of the first substrate 10 away from the liquid crystal layer 30, and the process difficulty may be reduced, and the process efficiency may be improved.

Figure 40:
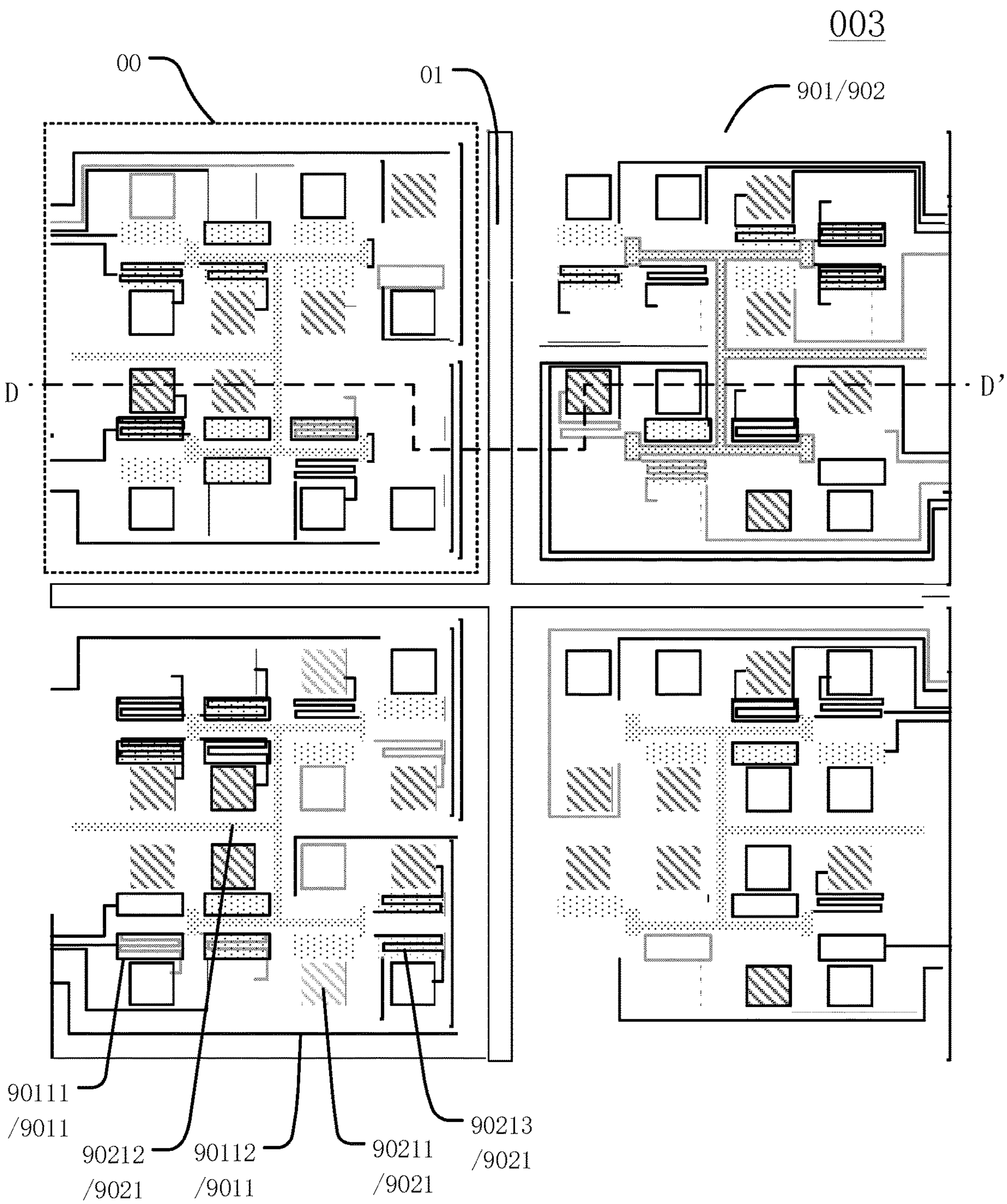
FIG. 40 illustrates another exemplary liquid crystal antenna according to various disclosed embodiments of the present disclosure.
Figure 41:
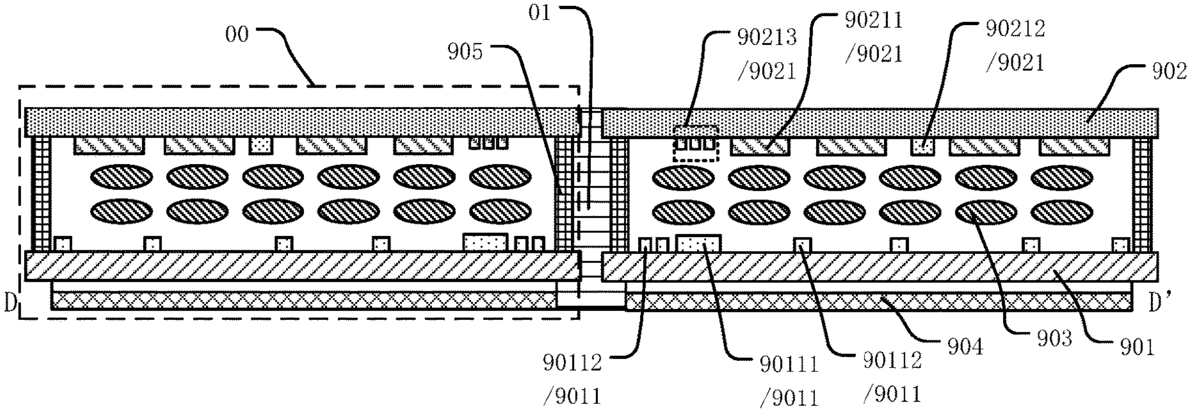
FIG. 41 illustrates a D-D'-sectional view of the exemplary liquid crystal antenna in FIG. 40.
Figure 42:
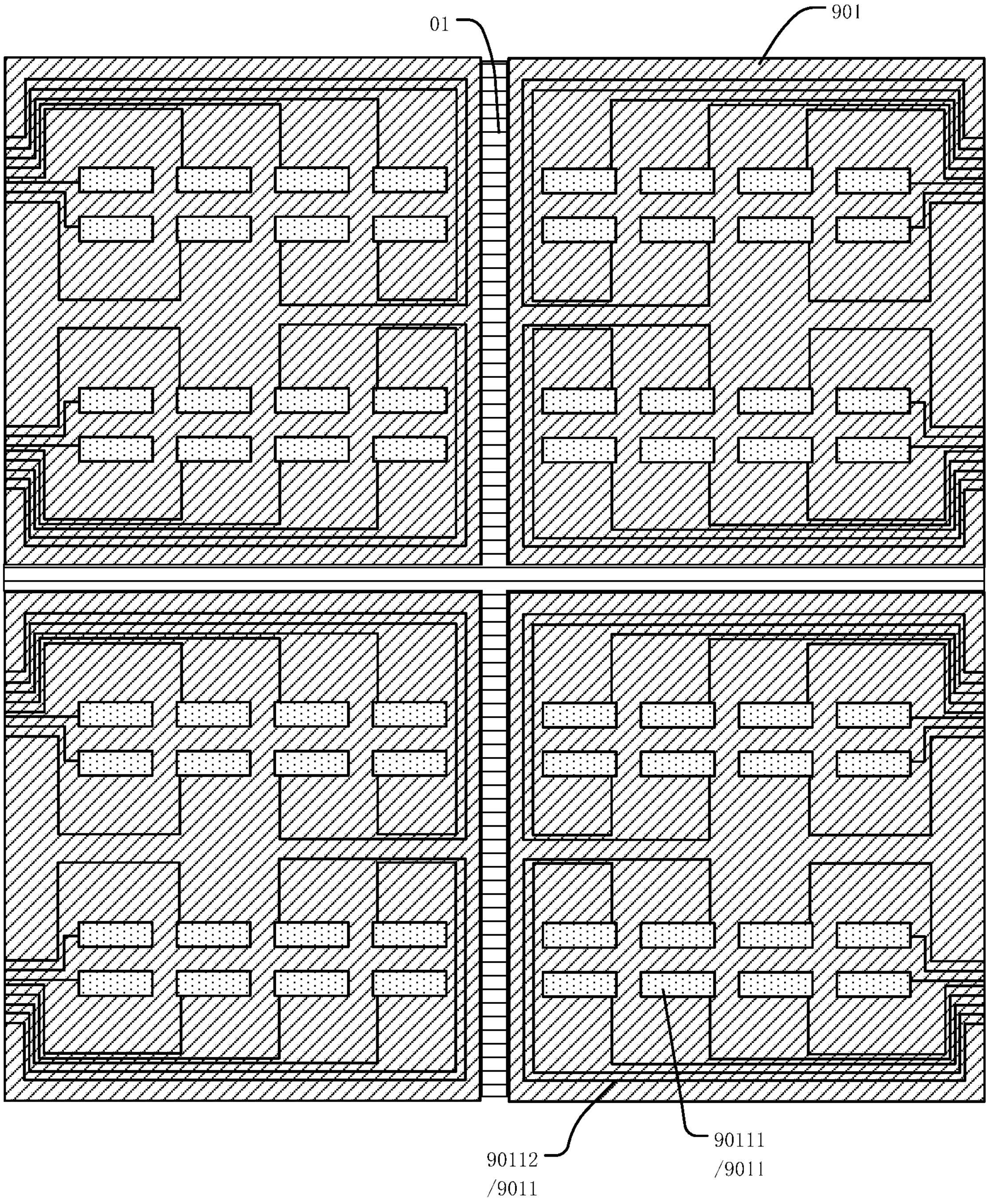
FIG. 42 illustrates an exemplary structure of a side of the fourth substrate facing toward the fifth substrate in FIG. 41.
Figure 43:
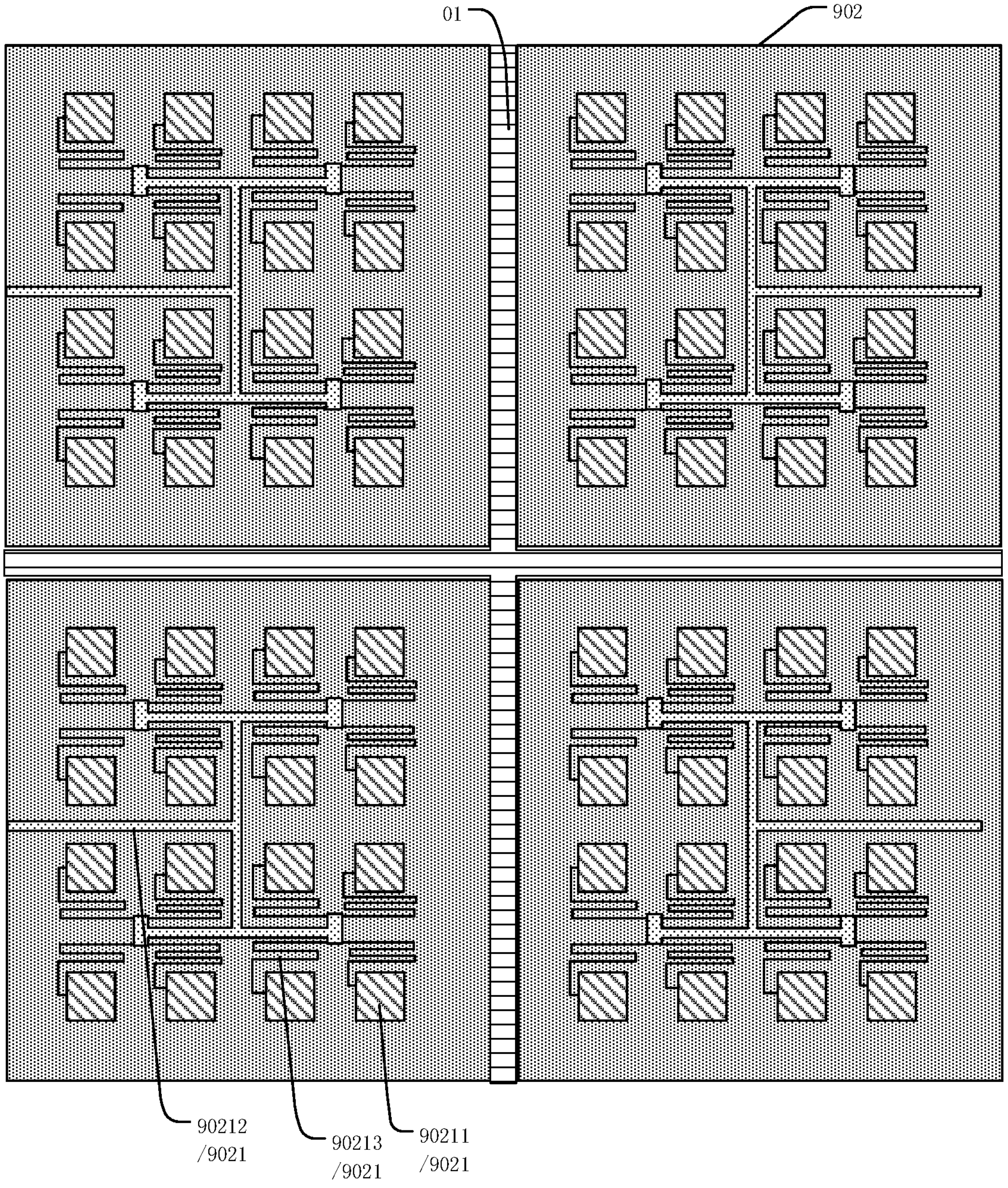
FIG. 43 illustrates an exemplary structure of a side of the fifth substrate facing toward the fourth substrate in FIG. 41.
Figure 44:
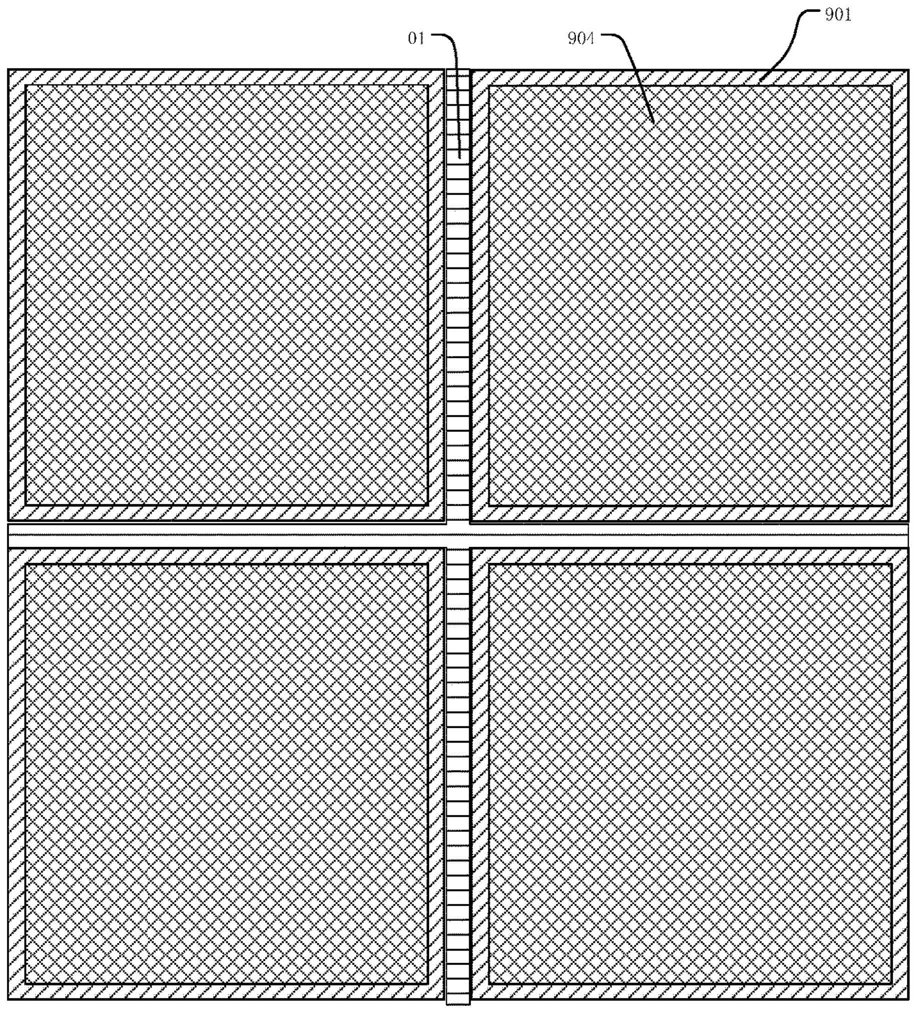
FIG. 44 illustrates an exemplary structure of a side of the fourth substrate facing away from the fifth substrate in FIG. 41.

FIG. 40 is a schematic diagram of a top view of another exemplary liquid crystal antenna according to various disclosed embodiments of the present disclosure (it is understandable that, to clearly illustrate the structure of this embodiment, FIG. 40 is filled with transparency). FIG. 41 is a D-D'-sectional view of the exemplary liquid crystal antenna in FIG. 40. FIG. 42 is a schematic structural diagram of the surface of the fourth substrate facing toward the fifth substrate in FIG. 41. FIG. 43 is a schematic diagram view of the surface of the fifth substrate facing toward the fourth substrate in 41. FIG. 44 is a schematic structural view of the surface of the fourth substrate facing away from the fifth substrate in FIG. 41.

As shown in FIGS. 40-44, a liquid crystal antenna 003 provided in this embodiment may include a plurality of spliced antenna units 00. Each antenna unit 00 may include a fourth substrate 901 and a fifth substrate 902 disposed oppositely, and a second liquid crystal layer 903 disposed between the fourth substrate 901 and the fifth substrate 902. A third conductive layer 9011 may be disposed on the side of the fourth substrate 901 facing the fifth substrate 902; a fourth conductive layer 9021 may be disposed on the side of the fifth substrate 902 facing toward the fourth substrate 901, and the fourth conductive layer 9021 may include at least a plurality of second radiation electrodes 90211. Further, a second external metal layer 904 may be disposed the side of the fourth substrate 901 facing away from the second liquid crystal layer 903, and the second external metal layer 904 may be connected to a fixed potential. The second external metal layers 904 corresponding to each antenna unit 00 may be electrically connected.

Specifically, the liquid crystal antenna 003 provided in this embodiment may include a plurality of spliced antenna units 00. In one embodiment, the plurality of antenna units 00 may be arranged as an array. For example, the liquid crystal antenna 003 illustrated in FIG. 40 may be a 2×2 (representing two antenna units 00 in the horizontal direction and two antenna elements 00 in the vertical direction) array spliced structure. It can be understood that the number of multiple spliced antenna units 00 included in the liquid crystal antenna 003 is not limited, other numbers of spliced antenna units 00 may also be included, such as an 8×8 array or a 16×16 array may be used to splice the antenna units 00 together to form the liquid crystal antenna 003.

Each antenna unit 00 in this embodiment may be understood as one unit of a liquid crystal antenna structure, and multiple antenna units 00 may be spliced together (disposed together). Further, two adjacent antenna units 00 may be spliced and fixed together using the adhesive 01 disposed between (or a structure with an adhesive property such as double-sided tape) and the adjacent antenna units 00 may also be spliced and fixed in other ways, which is not specifically limited in this embodiment. For the disclosed embodiments, on the one hand, the process for forming a large area of conductive structure of the antenna on a substrate may be avoided, and the difficulty of the manufacturing process may be reduced to a certain extent and the product yield may be improved. On the other hand, the design of the liquid crystal antenna 003 of the array structure formed by splicing may become standardized and may adapt to different requirements of the antenna array.

Each antenna unit 00 of this embodiment may include a fourth substrate 901 and a fifth substrate 902 that are opposed to each other, and a second liquid crystal layer 903 may be disposed between the fourth substrate 901 and the fifth substrate 902. The side of the fourth substrate 901 facing toward the fifth substrate 902 may include a third conductive layer 9011, and the third conductive layer 9011 may be used to provide a portion of the structures that realize the antenna function, such as a phaser. The side of the fifth substrate 902 facing toward the fourth substrate 901 may include a fourth conductive layer 9021. The fourth conductive layer 9021 may include at least a plurality of second radiation electrodes 90211, and the second radiation electrodes 90211 may be used to radiate out the microwave signal of the liquid crystal antenna 003. In one embodiment, the materials of the third conductive layer 9011 and the fourth conductive layer 9021 may not be specifically limited and may only need to be able to conduct electricity. For example, the materials of the third conductive layer 9011 and the fourth conductive layer 9021 may be metal conductive materials, such as copper, etc.

In one embodiment, the third conductive layer 9011 of this embodiment may include a second driving electrode 90111 and a second bias voltage signal line 90112. The second driving electrode 90111 may have a block structure as shown in FIG. 42. The second driving electrode 90111 may be connected to an external power supply terminal through at least one second bias voltage signal line 90112

(not shown in the figure, for example, a voltage signal may be provided by bonding a driving chip). Each second driving electrode 90111 may independently control the liquid crystal antenna through at least one second bias voltage signal line 90112. For example, the second bias voltage signal line 90112 may be used to transmit the voltage signal provided by the external power supply terminal to the second drive electrode 90111 to control the deflection electric field of the liquid crystal molecules of the second liquid crystal layer 903 between the fourth substrate 901 and the fifth substrate 902.

Further, in one embodiment, as shown in FIG. 42, the plurality of second driving electrodes 90111 may be uniformly distributed on the fourth substrate 901 as an array. It can be understood that the specific number, distribution, and material of the second driving electrodes 90111 on the side of the fourth substrate 901 facing toward the fifth substrate 902 may be set by those skilled in the art according to actual conditions, and there may be no specific limitation. The figure in this embodiment only exemplarily shows the wiring structure of each second bias voltage signal line 90112, which includes but is not limited to this, and may also be other layout structures, which is not limited in this embodiment.

In one embodiment, the fourth conductive layer 9021 of the fifth substrate 902 of this embodiment may include a second power division network structure 90212 and a plurality of phaser structures connected to the power division network structure 90212 in addition to a plurality of second radiation electrodes 90211. Further, each second phaser structure may have a one-to-one correspondence with the second driving electrode 90111 on the fourth substrate 901 to generate the deflection electric field of the liquid crystal molecules of the second liquid crystal layer 903. By controlling the voltage transmitted to the second drive electrode 90111 through the second bias voltage signal line 90112, the intensity of the electric field formed between the second phaser structure and the second driving electrode 90111 may be controlled to adjust the deflection angle of the liquid crystal molecules of the second liquid crystal layer 903 in the corresponding space to change the dielectric constant of the second liquid crystal layer 903. Accordingly, the phase shift of the microwave signal in the second liquid crystal layer 903 may be realized to achieve the effect of changing the phase of the microwave.

The second power division network structure 90212 of this embodiment may be configured to input microwave signals to each second phaser structure. The second phaser structure may be a second microstrip line 90213. The shape of the second microstrip line 90213 may be zigzag (as shown in FIG. 43) or spiral (not shown in the figure) or other structures. The microwave signal transmitted by the second power division network structure 90212 may be further transmitted to each second phaser structure. The zigzag or spiral-shaped second phaser structure may increase the direct facing area between the second phase shifter structure and the second driving electrode 90111 to ensure that as many liquid crystal molecules as possible in the second liquid crystal layer 903 are in the electric field formed by the second phaser structure and the second driving electrode 90111. Accordingly, the inversion efficiency of the liquid crystal molecules may be improved. This embodiment does not limit the shape and distribution of the second phaser structure and may only need to be able to realize the transmission of microwave signals. It can be understood that, to clearly illustrate the structure of this embodiment, FIG. 43 only illustrates the structure of 16 second phasers on the fifth substrate 902, but it is not limited to this number. In specific implementation, the number of the second phaser structures may be arrayed according to actual needs.

In one embodiment, the second radiation electrodes 90211 may be connected to the second phaser structure. After the phase shift of the microwave signal is completed, the phase shifted microwave signal may be transmitted to the second radiation electrodes 90211 through the phaser structure, and through the second radiation electrodes 90211, the microwave signal of each antenna unit 00 of the liquid crystal antenna 003 may be radiated out.

This embodiment only exemplifies the structures that may be included in the third conductive layer 9011 and the fourth conductive layer 9021 of the antenna unit 00 and may realize the antenna function, including but not limited to this. The third conductive layer 9011 on the fourth substrate 901 and the fourth conductive layer 9021 on the fifth substrate 902 may also include other structures that may realize the antenna function, as long as the third conductive layer 9011 may be only disposed on the side of the fourth substrate 901 facing toward the fifth substrate 902, the fourth conductive layer 9012 may be only disposed on the side of the fifth substrate 902 facing toward the fourth substrate 901, and the second radiation electrode 90211 may also be disposed in the liquid crystal cell. For example, such structures may be integrated in a liquid crystal cell. The structures used to realize the antenna function may only be disposed on one side surface of the same substrate to avoid the introduction of the process of manufacturing conductive layers on both sides of the substrate during the manufacturing process of the liquid crystal antenna 003. For example, the present embodiment may not need to use the process of fabricating and patterning conductive metal layers on both sides of a substrate and may reduce the need to fabricate a conductive structure on one side of the substrate and then turn it over to fabricate another conductive structure on the other side, and expose, develop, and etch. Thus, the manufacturing difficulty and the manufacturing cost may be reduced, and the production efficiency and the product yield may be improved.

In one embodiment, a second external metal layer 904 may be disposed the side of the fourth substrate 901 facing away from the second liquid crystal layer 903. The second external metal layer 904 may be connected to a fixed potential. The optional second external metal layer 904 may be a viscous connector (not filled in FIG. 41) fixed on the fourth substrate 901. The fixed potential of the optional second external metal layer 904 may also be provided by a bonded driving chip, which is not described in detail in this embodiment. It can be understood that the second external metal layer 904 may refer to a structure additionally formed on a side of the fourth substrate 901 away from the second liquid crystal layer 903 after the fourth substrate 901 and the fifth substrate 902 of each antenna unit 00 are formed into a liquid crystal cell. Thus, it may avoid disposing conductive metal layers on both sides of the fourth substrate 901 during the process of manufacturing the liquid crystal cell. Accordingly, the difficulty of the production process may be reduced, and the production efficiency may be improved. In one embodiment, the second external metal layer 904 may be disposed on the entire surface of the fourth substrate 901 on the side away from the second liquid crystal layer 903 after the liquid crystal cell is formed, and the second external metal layer 904 may be connected to a fixed potential. It can be understood that the specific potential value of the second external metal layer 904 connected to the fixed potential may not be specifically limited in this embodiment, and it may be selected and set according to actual requirements during specific implementation.

The second external metal layer 904 of this embodiment may not only be used as a reflective layer, but when the phase the microwave signal is shifted, it may ensure that the microwave signal only propagates in the liquid crystal cell of each antenna unit 00 during the phase shifting process, and may avoid to disperse to the outside of the liquid crystal antenna. When the microwave signal is transmitted to the second external metal layer 904, the microwave signal may be reflected back through the second external metal layer 904 of the entire surface structure. The second external metal layer 904 connected to with the fixed potential may also be used to shield external signals to avoid interference of external signals to microwave signals, thereby ensuring the accuracy of phase shifting of microwave signals. Thus, the radiation gain of the antenna may be increased. Because the second external metal layer 904 of this embodiment may be a whole surface structure, when the second external metal layer 904 is disposed on the side of the fourth substrate 901 away from the second liquid crystal layer 903 after the formation of the liquid crystal cell, the requirements for the bonding accuracy may be reduced, and the manufacturing difficulty and the manufacturing costs may be further reduced.

Figure 45:
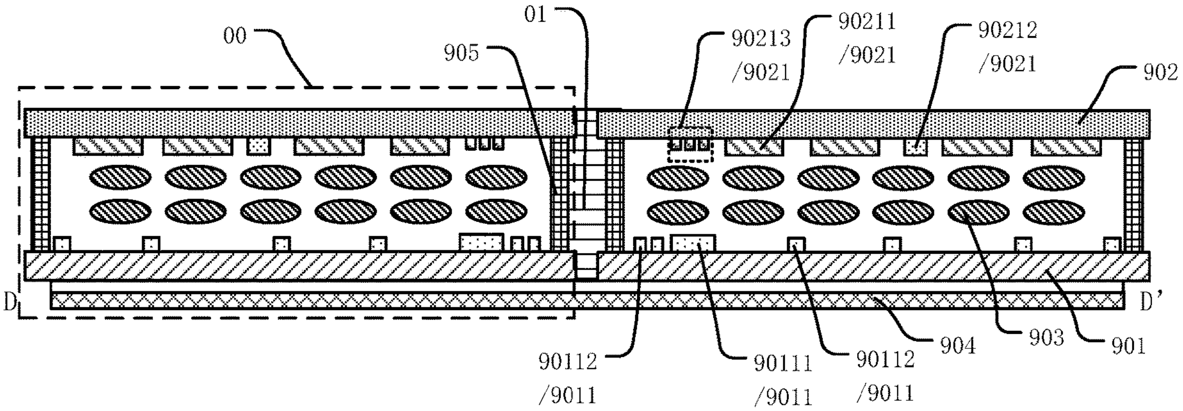
FIG. 45 illustrates another D-D'-sectional view of the exemplary liquid crystal antenna in FIG. 40.
Figure 46:
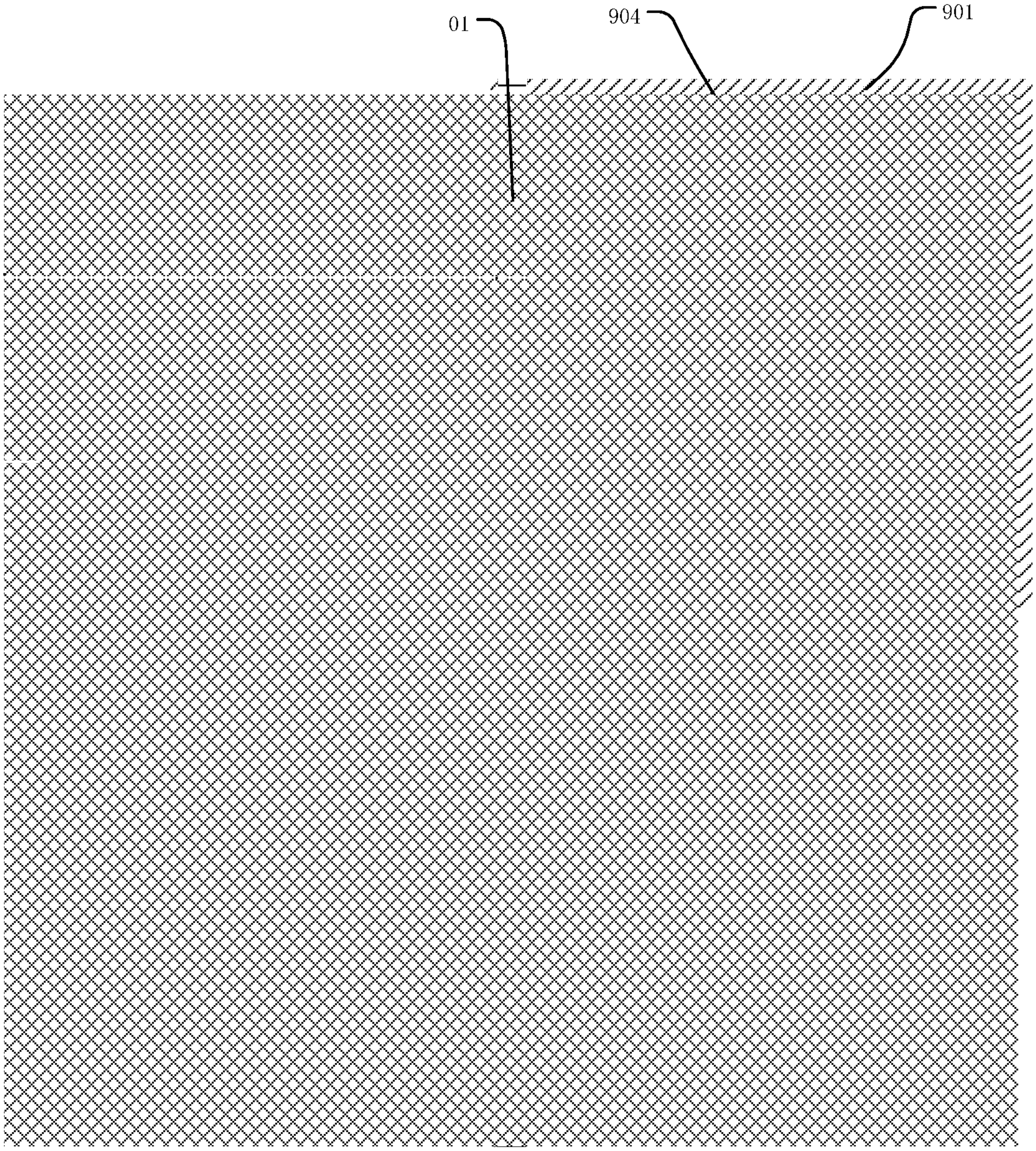
FIG. 46 illustrates an exemplary structure of a side the fourth substrate facing away from the fifth substrate in FIG. 45.

In addition, the second external metal layer 904 corresponding to each antenna unit 00 of this embodiment may be electrically connected. Thus, the second external metal layers 904 may jointly provide a fixed potential signal to each corresponding antenna unit 00 of the liquid crystal antenna 003; and the wiring may be simplified FIG. 45 is a schematic diagram of another exemplary D-D'-sectional view of the exemplary liquid crystal antenna in FIG. 40. FIG. 46 is structural view of the side of the fourth substrate in FIG. 45 facing away from the fifth substrate (it is understandable that, to clearly illustrate the structure of this embodiment, FIG. 46 is filled with transparency).

As shown in FIGS. 45-46 and referring to FIG. 40, the second external metal layer 904 corresponding to each antenna unit 00 of the liquid crystal antenna 003 of this embodiment may also be connected as one whole structure. For example, the second external metal layers 904 corresponding to each antenna unit 00 may be connected to each other to form a whole surface structure such that a plurality of second external metal layers 904 connected as a whole surface structure to form a carrier structure. The carrier structure may be used to carry a plurality of spliced antenna units 00. Thus, the manufacturing process of the second external metal layers 904 may be simplified.

It should be noted that the fourth substrate 901, the fifth substrate 902, and the second liquid crystal layer 903 of each antenna unit 00 of this embodiment may form a liquid crystal cell. The specific process of forming the liquid crystal cell may be set by those skilled in the art according to the actual situation; and there is no limitation here. For example, the second frame sealant 905 may be coated on the fourth substrate 901, and then liquid crystal may be dispersed by the liquid crystal injection technology, and the fourth substrate 901 and the fifth substrate 902 may be aligned and bonded according to the alignment marks on the fifth substrate 902. The second frame sealant 905 may be cured to stably adhere to the fourth substrate 901 and the fifth substrate 902, and the liquid crystal cell may be obtained. The materials of the fourth substrate 901 and the fifth substrate 902 may also be set by those skilled in the art according to the actual situation, which is not limited here. Exemplarily, the fourth substrate 901 and the fifth substrate 902 may be any rigid material, such as glass and ceramics, or may be any flexible material, such as polyimide and silicon nitride. Because such materials may not absorb microwave signals, the insertion loss in the microwave frequency band may be substantially small, the signal insertion loss may be reduced, and the loss of microwave signals in the transmission process may be significantly reduced.

It should be further explained that this embodiment only exemplarily illustrates the structure of the antenna units 00 of the liquid crystal antenna 003, but it is not limited to this, and may also include other structures, such as the alignment layer, etc. between the fourth substrate 901 and the fifth substrate 902. The structures may be specifically understood with reference to the structure of the liquid crystal antenna in the related art, which is not repeated in this embodiment. This embodiment is only an example of the structures that the third conductive layer 9011 and the fourth conductive layer 9021 may be provided, including but not limited to the above-mentioned structures and working principle. In specific implementation, it may be set according to the required functions of the liquid crystal antenna; and the examples are not repeated here.

Figure 47:
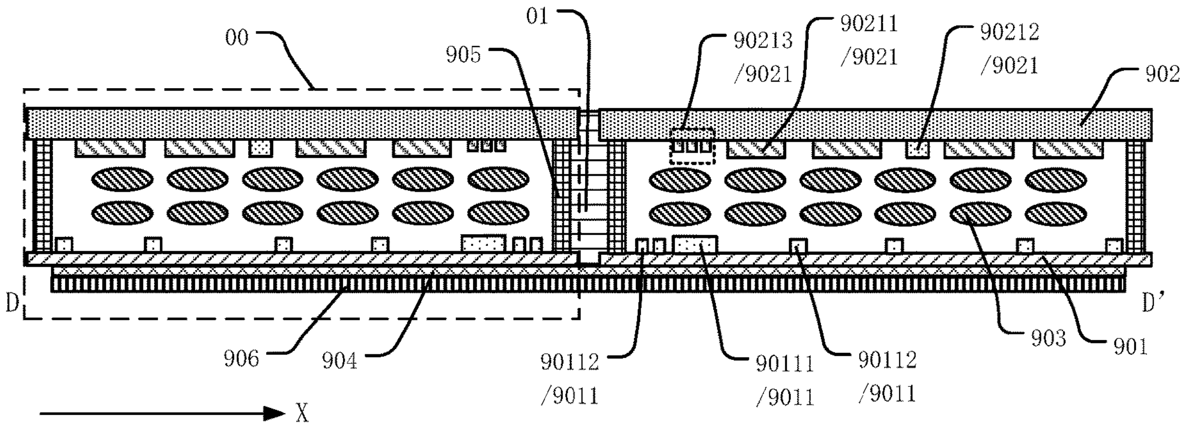
FIG. 47 illustrates another D-D'-sectional view of the exemplary liquid crystal antenna in FIG. 40.
Figure 48:
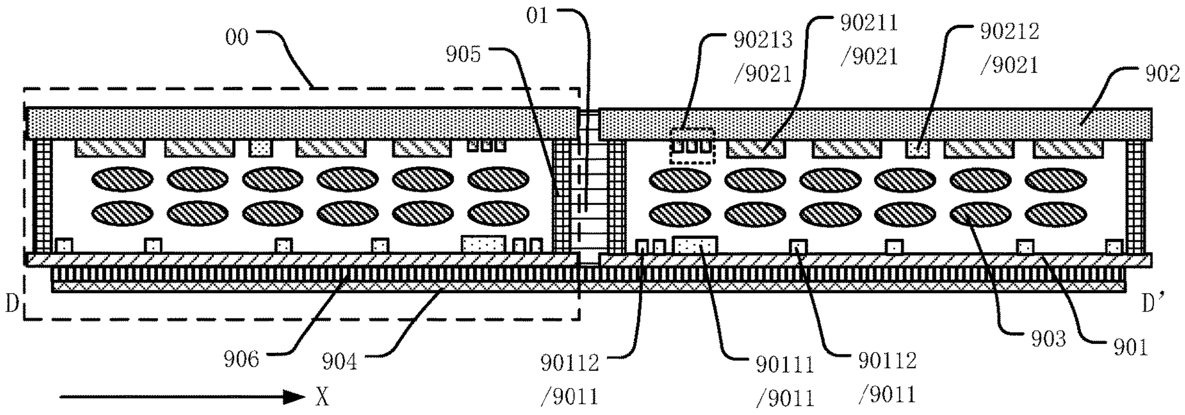
FIG. 48 illustrates another D-D'-sectional view of the exemplary liquid crystal antenna in FIG. 40.

FIG. 47 is a schematic diagram of another exemplary D-D'-sectional view of the exemplary liquid crystal antenna in FIG. 40. FIG. 48 is a schematic diagram of another exemplary D-D'-sectional view of the exemplary liquid crystal antenna in FIG. 40.

As shown in FIGS. 47-48, and referring to FIG. 40, the present disclosed liquid crystal antenna 003 may also include a sixth substrate 906. In a direction X parallel to the plane where the sixth substrate 906 is located, a plurality of antenna units 00 may all be disposed on the same sixth substrate 906. The second external metal layer 904 may be bonded and fixed on the sixth substrate 906. The sixth substrate 906 may be located on a side of the fourth substrate 901 facing away from the fifth substrate 902.

In one embodiment, after the fourth substrate 901 and the fifth substrate 902 are formed into a liquid crystal cell, the second external metal layer 904, which is additionally fabricated on the surface of the fourth substrate 901 away from the second liquid crystal layer 903, may be attached on the sixth substrate 906. The sixth substrate 906 may be configured as the carrier substrate for the plurality of second external metal layers 904, and may be fixed on the side of the fourth substrate 901 away from the fifth substrate 902 together with the second external metal layer 904.

In the fabrication process, a large-area sixth substrate 906 and a plurality of second external metal layers 904 connected as a whole may be fabricated to form a fixed structure firstly, and then, after the fourth substrate 901 and the fifth substrate 902 are formed into a liquid crystal cell, the respective antenna units 00 may be collectively arranged on the fixing structure formed by the same sixth substrate 906 and the plurality of second external metal layers 904 connected as a whole. Accordingly, the same sixth substrate 906 may be used as a carrier substrate for the plurality of antenna units 00, and it may be possible to realize the splicing and fixing of the plurality of antenna units 00 on the same sixth substrate 906. Thus, the process for forming conductive metal layers both sides of the fourth substrate 901 may be avoided, thereby further reducing the difficulty of the production process, and improving production efficiency at the same time. It may also reduce requirements of the bonding accuracy of the fixing structure formed by the same sixth substrate 906 and the plurality of second external metal layers 904 connected as a whole. Thus, the difficulty of bonding and the manufacturing cost may be further reduced.

It is understandable that the sixth substrate 906 in this embodiment may be one of a flexible substrate or a rigid substrate. For example, the material of the sixth substrate 906 may be any rigid/hard material, such as glass and ceramic, or it may also be any kind of flexible material, such as polyimide and silicon nitride. Because the above-mentioned materials may not absorb microwave signals, the insertion loss in the microwave frequency band may be substantially small. Thus, the signal insertion loss may be reduced, and the microwave signal loss during the transmission may be significantly reduced.

This embodiment does not limit the specific positions of the sixth substrate 906 and the second external metal layer 904 on the side of the fourth substrate 901 away from the second liquid crystal layer 903 after the second external metal layer 904 is disposed. In some embodiments, as shown in FIG. 40 and FIG. 47, after the liquid crystal antenna 003 of this embodiment is fabricated, the second external metal layer 904 may be disposed on the side of the sixth substrate 906 adjacent to the fourth substrate 901. For example, the second external metal layer 904 may be bonded and fixed on the fourth substrate 901. In other embodiments, as shown in FIG. 40 and FIG. 48, after the liquid crystal antenna 003 of this embodiment is fabricated, the second external metal layer 904 may be disposed on the side of the sixth substrate 906 away from the fourth substrate 901. For example, the sixth substrate 906 and the respective fourth substrate 901 may be bonded and fixed.

In one embodiment, when the sixth substrate 906 is disposed between the fourth substrate 901 and the second external metal layer 904, the total thickness of the sixth substrate 906 and the fourth substrate 901 after being bonded and fixed may be equal to the thickness of the fifth substrate 902. The increase of the insertion loss of the high-frequency signal caused by the too large total thickness of the sixth substrate 906 and the fourth substrate 901 after being bonded and fixed as a whole may be avoided. Thus, the gain of the liquid crystal antenna of this embodiment may be increased and the signal insertion loss may be reduced.

It can be understood that each antenna unit in this embodiment may be understood as the liquid crystal antenna 000 in the above embodiments, and the second external metal layer 904 in this embodiment may be a copper layer structure with a whole surface structure, and the sixth substrate 906 may be a printed circuit board. The second external metal layer 904 of this embodiment may also be a copper adhesive with a whole surface structure. The specific effects that can be achieved may be referred to the implementation of the second external metal layer 904 having a copper layer structure or a copper adhesive structure in the above embodiments, and this embodiment will not be repeated here.

It can be seen from the foregoing embodiments that the liquid crystal antenna and the fabrication method of the liquid crystal antenna provided by the present disclosure may achieve at least the following beneficial effects.

In the liquid crystal antenna provided by the present disclosure, the first substrate may be provided with the first conductive layer only on the side facing toward the second substrate, the second substrate may be provided with the second conductive layer only on the side facing toward the first substrate, and the radiation electrodes may also be provided in the liquid crystal cell. For example, the structures integrated in a liquid crystal cell and used to realize the antenna function may only be disposed on one side surface of a same substrate to avoid the introduction of the processes for forming conductive layers on both sides of the substrate during the fabrication process of the liquid crystal antenna. That is, the present disclosure may not need to use the process of fabricating and patterning conductive metal layers on both surfaces of a substrate, and may reduce the needs for fabricating conductive structures on one side of the substrate and then turning it over to fabricate another conductive layer on the other side of the substrate, and the processes of exposure, development, and etching. Thus, the manufacturing difficulty and manufacturing cost may be reduced, and the production efficiency, and the product yield may be improved. The side of the first substrate of the present disclosure away from the liquid crystal layer may also include an external metal layer, which may be connected to a fixed potential. The external metal layer may refer to the structure additionally formed on the side surface of the first substrate facing away from the liquid crystal layer after the first substrate and the second substrate are formed into a liquid crystal cell. Thus, the process for forming conductive metal layers on two sides of one first substrate during the process for forming the liquid crystal cell may be avoided. According, the difficulty of the production process may be reduced, and the production efficiency may be improved. The external metal layer of the present disclosure may not only be used as a reflective layer, but when the phase of the microwave signal is shifted, it may ensure that the microwave signal is only propagated in the liquid crystal cell of the liquid crystal antenna during the phase shifting process and may prevent it from diverging to the outside of the liquid crystal antenna. When the microwave signal is transmitted to the external metal layer, the microwave signal may be reflected back through the external metal layer of the entire structure. The external metal layer connected to a fixed potential may also be used to shield external signals to avoid external signals from interfering the microwave signals to ensure the accuracy of the phase shift of the microwave signal. Thus, the radiation gain of the antenna may be increased. Further, when the external metal layer of the present disclosure is disposed on the side of the first substrate away from the liquid crystal layer after the liquid cell is formed, the requirements for the bonding accuracy may be reduced, and the manufacturing difficulty and the manufacturing cost may be further reduced.

Although some specific embodiments of the present disclosure have been described in detail through examples, those skilled in the art should understand that the above examples are only for illustration and not for limiting the scope of the present disclosure. Those skilled in the art should understand that the above embodiments can be modified without departing from the scope and spirit of the present disclosure. The scope of the disclosure is defined by the appended claims.

What is claimed is:

1. A liquid crystal antenna, comprising:

a first substrate;

a second substrate opposite to the first substrate; and a liquid crystal layer disposed between the first substrate and the second substrate, wherein:

a first conductive layer is disposed on a side of the first substrate facing toward the second substrate, the first conductive layer including a plurality of first driving electrodes;

a second conductive layer is disposed on a side of the second substrate facing toward the first substrate, the second conductive layer at least including a plurality of radiation electrodes, a power division network structure, and a plurality of microstrip lines, wherein:

the power division network structure is connected to a signal input terminal;

one end of a microstrip line of the plurality of microstrip lines is connected to the power division network structure;

another end of the microstrip line is respectively connected to the plurality of radiation electrodes; and an orthographic projection of a first driving electrode on the second substrate at least partially overlaps the microstrip line; and an external metal layer is disposed on a side of the first substrate away from the liquid crystal layer, the external metal layer being connected to a fixed potential.

2. The liquid crystal antenna according to claim 1, wherein:

the external metal layer is electrically connected to ground.

3. The liquid crystal antenna according to claim 1, wherein:

the power division network structure includes a main section and a plurality of branch sections;

one end of the main section is connected to the signal input terminal;

another end of the main section is connected to one end of a branch section of the plurality of branch sections; and another end of the branch section is connected to a microstrip line of the plurality of microstrip lines.

4. The liquid crystal antenna according to claim 1, wherein:

a first driving electrode of the plurality of first driving electrodes is connected with a bias voltage signal line.

5. The liquid crystal antenna according to claim 1, wherein:

the first conductive layer includes a power division network structure and a plurality of microstrip lines;

the second conductive layer further includes a plurality of second driving electrodes, and the plurality of second driving electrodes and the plurality of radiation electrodes are insulated from each other;

the power division network structure is connected to a signal input terminal, and one end of a microstrip line of the plurality of microstrip lines is connected to the power division network structure; and an orthographic projection of the microstrip line on the second substrate at least partially overlaps a second driving electrode of the plurality of second driving electrodes.

6. The liquid crystal antenna according to claim 5, wherein:

the power division network structure includes a main section and a plurality of branch sections;

one end of the main section is connected to the signal input terminal;

another end of the main section is connected to one end of a branch section of the plurality of branch sections; and another end of the branch section is connected to a microstrip line of the plurality of microstrip lines.

7. The liquid crystal antenna according to claim 5, wherein:

the second driving electrode is connected with a bias voltage signal line.

8. The liquid crystal antenna according to claim 1, further comprising:

a third substrate, wherein:

the external metal layer is attached on the third substrate; and the third substrate and the external metal layer together are fixed to a side of the first substrate facing away from the liquid crystal layer.

9. The liquid crystal antenna according to claim 8, wherein:

the external metal layer is attached and fixed on a side surface of the first substrate facing away from the second substrate; and the third substrate is disposed on a side of the external metal layer facing away from the first substrate.

10. The liquid crystal antenna according to claim 8, wherein:

the third substrate is attached and fixed on a side surface of the first substrate facing away from the second substrate; and the external layer is disposed on a side of the third substrate facing away from the first substrate.

11. The liquid crystal antenna according to claim 10, wherein:

a total thickness of the third substrate and the first substrate is equal to a thickness of the second substrate.

12. The liquid crystal antenna according to claim 8, wherein:

the third substrate includes one of a flexible substrate and a rigid substrate.

13. The liquid crystal antenna according to claim 8, wherein:

the external metal layer is a copper layer structure; and the third substrate is made of one of resin and plastic.

14. The liquid crystal antenna according to claim 8, wherein:

a thickness of the third substrate is smaller than a thickness of the second substrate.

15. The liquid crystal antenna according to claim 1, wherein:

the external metal layer is a copper adhesive; and the copper adhesive is attached on a side of the first substrate facing away from the second substrate.

16. The liquid crystal antenna according to claim 15, wherein:

the copper adhesive includes a first adhesive layer; and the first adhesive layer is doped with copper particles.

17. The liquid crystal antenna according to claim 15, wherein:

the copper adhesive includes a second adhesive layer and a copper foil layer;

the second adhesive layer is attached to the first substrate; and a thickness of the second adhesive layer is smaller than or equal to 100 μm.

18. A method for fabricating a liquid crystal antenna, comprising:

providing a first substrate and forming a first conductive layer on a side of the first substrate, wherein forming the first conductive layer includes forming a plurality of driving electrodes in the first conductive layer;

providing a second substrate and forming a second conductive layer on a side of the second substrate, wherein the second conductive layer at least includes a plurality of radiation electrodes of block shape, a power division network structure, and a plurality of microstrip lines, wherein:

the power division network structure is connected to a signal input terminal;

one end of a microstrip line of the plurality of microstrip lines is connected to the power division network structure;

another end of the microstrip line is respectively connected to the plurality of radiation electrodes; and an orthographic projection of a driving electrode on the second substrate at least partially overlaps the microstrip line;

pairing the first substrate with the second substrate, and disposing a liquid crystal layer between the first substrate and the second substrate, wherein the first conductive layer is disposed opposite to the second conductive layer; and disposing an external metal layer on a side of the first substrate facing away from the liquid crystal layer to cause the external metal layer to be connected with a fixed potential.

19. A liquid crystal antenna, comprising:

a plurality of antenna units spliced together, wherein:

each of the plurality of antenna units includes a first substrate and a second substrate opposite to the first substrate and a first liquid crystal layer disposed between the first substrate and the second substrate;

a first conductive layer is disposed on a side of the first substrate facing toward the second substrate, the first conductive layer including a plurality of driving electrodes;

a second conductive layer is disposed on a side of the second substrate facing toward the first substrate, the second conductive layer at least including a plurality of radiation electrodes, a power division network structure, and a plurality of microstrip lines, wherein:

the power division network structure is connected to a signal input terminal;

one end of a microstrip line of the plurality of microstrip lines is connected to the power division network structure;

another end of the microstrip line is respectively connected to the plurality of radiation electrodes; and an orthographic projection of a driving electrode on the second substrate at least partially overlaps the microstrip line;

a first external metal layer is disposed on a side of the first substrate facing away from the first liquid crystal layer, the first external metal layer being connected to a fixed potential; and all corresponding first external metal layers of the plurality of antenna units are electrically connected to form a whole surface structure.

* * * * *